US011144434B2

(12) United States Patent
Potter et al.

(10) Patent No.: US 11,144,434 B2
(45) Date of Patent: Oct. 12, 2021

(54) REFINING COVERAGE ANALYSES USING CONTEXT INFORMATION

(71) Applicant: The MathWorks, Inc., Natick, MA (US)

(72) Inventors: William Potter, Waddell, AZ (US); William Aldrich, Sudbury, MA (US); Aaron Hughes, Millis, MA (US); Anjali Joshi, Needham, MA (US); Zsolt Kalmar, Framingham, MA (US); Ebrahim M. Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/731,438

(22) Filed: Dec. 31, 2019

(65) Prior Publication Data

US 2020/0379886 A1 Dec. 3, 2020

Related U.S. Application Data

(60) Provisional application No. 62/855,802, filed on May 31, 2019.

(51) Int. Cl.
*G06F 11/36* (2006.01)
(52) U.S. Cl.
CPC .................. *G06F 11/3676* (2013.01)
(58) Field of Classification Search
CPC .................................................. G06F 11/3676
See application file for complete search history.

(56) References Cited

U.S. PATENT DOCUMENTS

| 8,234,105 | B1 | 7/2012 | Aldrich et al. |
| 8,423,345 | B1* | 4/2013 | Aldrich ..................... G06F 8/10 |
| | | | 703/22 |
| 8,522,215 | B1 | 8/2013 | Aldrich et al. |
| 9,146,838 | B2 | 9/2015 | Boissy et al. |
| 9,665,350 | B1* | 5/2017 | Kalmar ............... G06F 11/3676 |
| 10,467,132 | B1* | 11/2019 | Chatterjee .......... G06Q 10/0639 |
| 2005/0166094 | A1* | 7/2005 | Blackwell ........... G06F 11/3688 |
| | | | 714/38.14 |
| 2018/0089067 | A1* | 3/2018 | Huang ................ G06F 11/3684 |

\* cited by examiner

*Primary Examiner* — S. Sough
*Assistant Examiner* — Stephen D Berman
(74) *Attorney, Agent, or Firm* — Wolf, Greenfield & Sacks, P.C.

(57) ABSTRACT

Systems and methods for coverage analysis using context information are described. The systems and methods can be used to obtain program code and test information for testing the program code, the test information associated with context information for providing context for testing the program code. Coverage information can be generated by testing the program code according to the test information. A first association can be generated between the context information and the test information. A second association can be generated between the context information and the program code. A third association can be generated between the coverage information and the test information. A subset of the coverage information can be determined based on the third association and a fourth association between the test information and the program code determined based on the first and second associations. An indication of the subset of the coverage information can be displayed.

21 Claims, 14 Drawing Sheets

FIG. 8

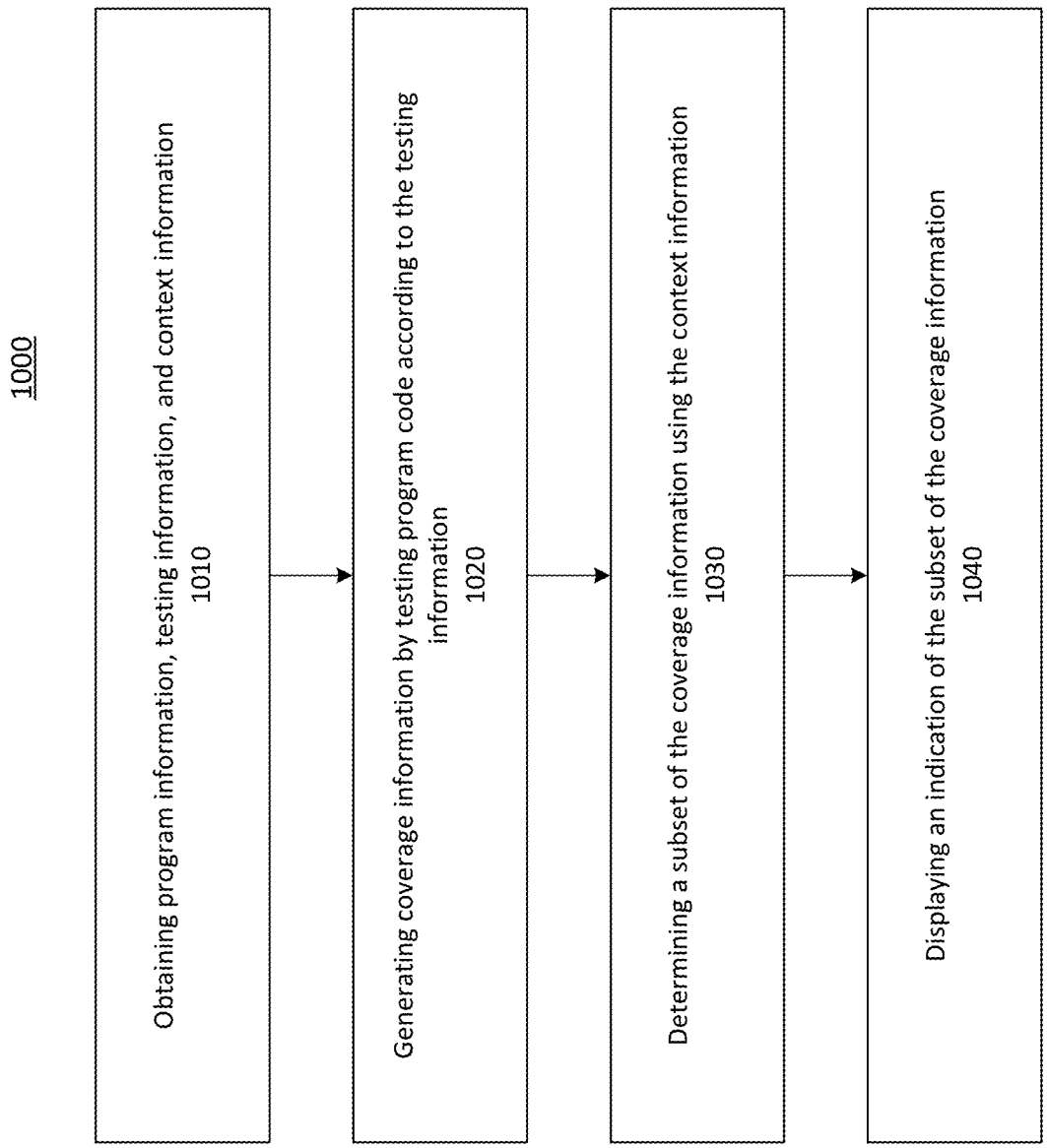

REFINING COVERAGE ANALYSES USING CONTEXT INFORMATION

This application is a Non-Prov of Prov (35 USC 119(e)) of U.S. Application Ser. No. 62/855,802, filed May 31, 2019, entitled "REFINING COVERAGE ANALYSES USING CONTEXT INFORMATION" the entire contents of which is incorporated by reference herein.

SUMMARY OF THE DISCLOSURE

According to various aspects, systems and methods are provided for refining coverage analyses using context information. In certain embodiments a system is provided that may include at least one processor and at least one memory. The at least one memory may include instructions that, when executed by the at least one processor, cause the system to perform operations. The operations may include obtaining program information including program code and test information for testing the program code, the test information associated with context information for providing context for testing the program code. The operations may further include generating coverage information by testing the program code according to the test information. The operations may also include determining a first association between the context information and the test information. The operations may additionally include determining a second association between the context information and the program code. The operations may further include determining a third association between the coverage information and the test information. The operations may also include determining a subset of the coverage information based on the third association and a fourth association between the test information and the program code, the fourth association determined based on the first and second associations. Furthermore, the operations may include providing instructions to display an indication of the subset of the coverage information.

The foregoing summary is provided by way of illustration and is not intended to be limiting.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 8 depicts an exemplary application of test criteria context information;

FIG. 10A depicts an exemplary method for sub-setting coverage information;

Figure 1:
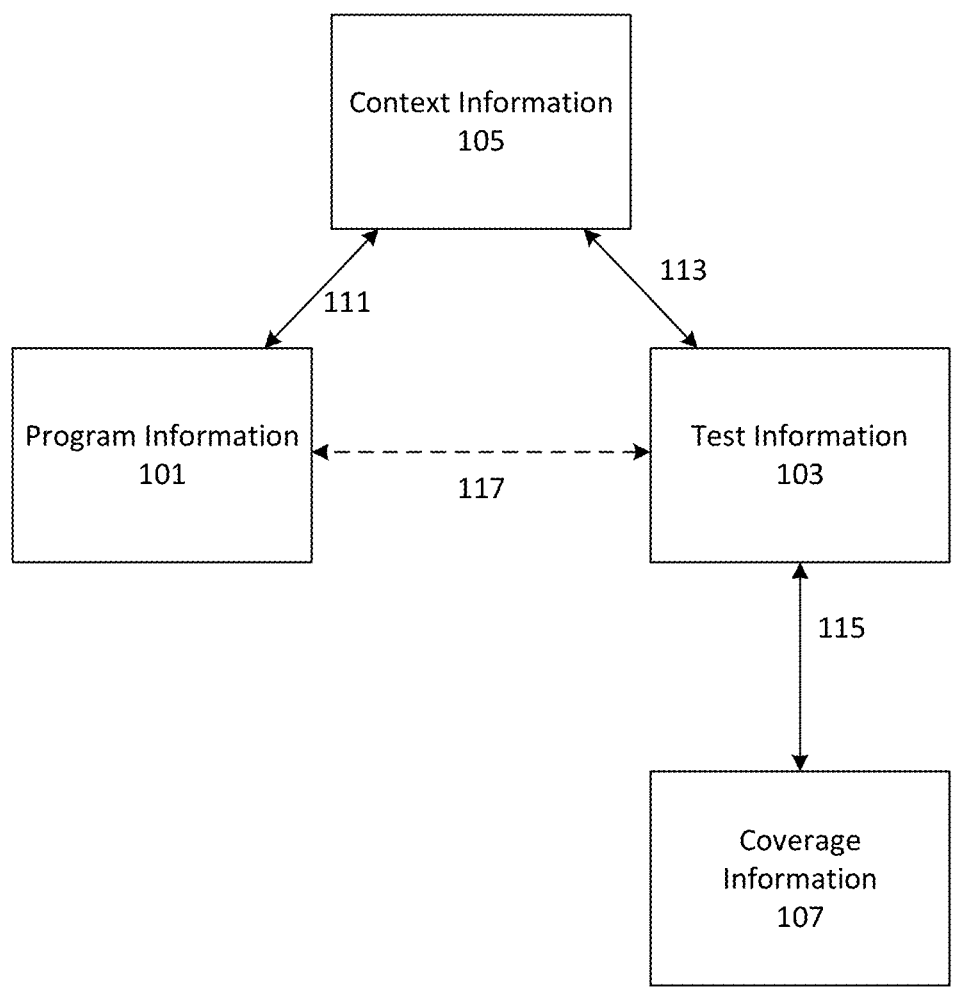
FIG. 1 depicts generation of an association between program information and test information.

The features and advantages of the present invention will become more apparent from the detailed description set forth below when taken in conjunction with the drawings.

DETAILED DESCRIPTION

The following detailed description refers to the accompanying drawings. The same reference numbers in different drawings may identify the same or similar elements.

Program code for use in real-world systems requires testing and verification prior to deployment. For example, control systems for vehicles, such as aircraft or automobiles, must undergo testing and verification before deployment in embedded control systems for the vehicle. Such testing and verification is intended to identify undesired or unexpected behaviors and verify the performance and functionality of the program code. The comprehensiveness of testing may be important, as undesired or unexpected behaviors may otherwise be missed. Deployment of an aircraft control system with unknown failure modes, for example, may have tragic consequences.

Testing and verification of program code can include performing a coverage analysis of the program code. Such a coverage analysis may include dynamically analyzing how the program code executes, and may provide a measure of completeness for testing. However, absent a way to refine the coverage analysis to meaningful coverage, the coverage analysis may overstate the comprehensiveness of testing. For example, a test intended or suitable for testing a first component of the program code may invoke execution of the first component and invoke execution of a second component of the program code. However, the test may not be intended or suitable for testing the second component of the program code. A coverage analysis that does not distinguish between execution of the first component and execution of the second component may overstate the comprehensiveness of testing.

The inventors have recognized and appreciated that a coverage analysis may be refined based on context information. The contextual information may be additional information, e.g., external to or extracted from, the tests and/or the program code. The context information may be used to refine a coverage analysis of the program code and determine whether coverage collected during the tests is meaningful under the context. For example, in the example described above, the coverage of the first component of the program code may be determined to be meaningful, while the coverage of the second component of the program code is non-meaningful, under the context of the intent of the tests, which can be derived from the design requirements, test requirements, or other sources.

The inventors have recognized and appreciated that refining a coverage analysis based on context information may improve the precision of the coverage analysis. For example, a test may exercise multiple portions of the program code, but the test may only be designed or intended to verify performance or functionality of a subset of these multiple portions of the program code. The contribution of the test to the coverage analysis may then be refined to the portions of the program code that the test was intended or designed to verify. Refining the coverage analysis in this manner may better reflect the design or intent of the tests and may reveal additional gaps in coverage. Such a gap may include a portion of the program code lacking coverage by a test designed or intended to cover that portion of the program code, as determined from context.

Improving the precision of the coverage analysis may result in better-tested code. Gaps in meaningful coverage for a portion of program code may be addressed by tests designed or intended to cover that portion of program code. These additional tests may uncover unintended behavior, resulting in revisions to the program code. In this manner, refining coverage analyses based on context information may improve the quality of the analyzed code.

The inventors have recognized and appreciated technical problems with alternative approaches to refining coverage analysis. Limiting tests to particular components or sub-component may be difficult or impossible when the program code contains multiple components or sub-components. Creating test harnesses to test individually test components or sub-components may be difficult, unwieldy, or inefficient. Such individual testing may also be inadequate: certain behavior may only emerge when a component operates in the context of the overall system. Thus a user, e.g., a program code developer, may want to test scenarios implicating multiple components or sub-components of the program code.

The inventors have also recognized and appreciated that the scale and complexity of coverage analyses can prevent manual identification of meaningful coverage. As would be recognized by those of skill in the art, testing can involve thousands of requirements and hundreds of tests. Program code can include thousands of components (and for graphical program code, tens to hundreds of thousands of blocks). Coverage analyses may implicate tens to hundreds of thousands of coverage points. Identifying meaningful coverage under such conditions poses a significant technical problem. Accordingly, the systems and methods described herein provide technical solutions to technical problems with alternative approaches to refining coverage analyses. Furthermore, by improving the identification of meaningful coverage, the described systems and methods further improve the efficiency of testing and developing program code.

The terms "code," "program," "program code," and/or "programming code," as used herein, are to be used interchangeably and are to be broadly interpreted to include textual code, graphical code, or a combination of textual and graphical code. Textual code can include text-based code that may require further processing to execute (e.g., Ada, Basic, JAVA, C, C++, C#, FORTRAN, or assembly language code; Hardware Description Language (HDL) code, very-high-speed integrated circuits (VHSIC) HDL (VHDL) code, VERILOG, SystemC and/or other types of hardware or software based code that may be compiled and/or synthesized); binary code that may be executed (e.g., executable files that may directly be executed by an operating system, bitstream files that can be used to configure a field-programmable gate array (FPGA), JAVA byte code, code (e.g., LLVM intermediate representation) that can be consumed or processed by a virtual machine, e.g., LLVM, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, textual code may include different combinations of the above-identified classes (e.g., text-based code, binary code, text files, etc.). Alternatively, or additionally, textual code may include code in a programming language that supports dynamic typing (e.g., the M language, a MATLAB® language, a MATLAB-compatible language, a MATLAB-like language, Julia, etc.) that can be used to express problems and/or solutions in mathematical notations. Graphical code may include models built connecting graphical blocks, where each block may represent an object associated with functionality and/or data. Blocks may be hierarchical in the sense that each block itself may be implemented as one or more blocks. A user may, for instance, view the model at a high level, then select blocks to drill down into the model to see increasing levels of model detail. Graphical code may be directly converted into textual code executable in a target environment. For example, graphical code can include a model of a control system for an automobile, which may be implemented in textual code deployed in an embedded system in the automobile. Environments for generating exemplary graphical code include Simulink®, Stateflow®, SimEvents™, etc., by The MathWorks, Inc.; VisSim by Visual Solutions: LabView® by National Instruments; Dymola by Dynasim: SoftWIRE by Measurement Computing: WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence: Rational Rose from IBM; Rhopsody or Tau from Telelogic; Ptolemy from the University of California at Berkeley; Agilent VEE by Agilent Technologies; Advanced Design System (ADS) by Agilent Technologies; Agilent Ptolemy by Agilent Technologies; SCADE Suite by Ansys; ASCET, CoWare, or aspects of a Unified Modeling Language (UML) or SysML environment.

The term "coverage analysis" as used herein, is to be broadly interpreted to include a determination of how much of program code has been exercised by a suite of tests. A coverage analysis can include a control flow-based coverage analysis that determines whether statements, decisions, or conditions in the program code have been exercised and/or a data flow-based coverage analysis that evaluates creation and use of values during execution of the program code. For example, data flow-based coverage analysis may track the creation and accessing of memory locations associated with variables during execution of the program code. A coverage analysis may include determining whether a test exercises simulation pathways through a model. For example, coverage analysis may determine whether components, transitions, inputs, outputs, or states of a graphical model have been exercised. A coverage analysis can include execution coverage, decision coverage, condition coverage, modified condition/decision coverage, lookup table coverage, signal range coverage, signal size coverage, objectives and constraints coverage, saturate on integer overflow coverage, relational boundary coverage, toggle coverage, and/or other coverage measures.

The term "coverage point" as used herein, is to be broadly interpreted to include an object of a coverage analysis. For a particular coverage analysis, program code may be associated with multiple coverage points. The type of the coverage analysis may determine the particular coverage points for the program code. For example, when the coverage analysis is decision coverage, the coverage points may be decision points in the program code (e.g. potential outcomes of control flow statements, switch block outputs in a graphical model, Stateflow® states, or the like). As an additional example, when the coverage analysis is condition coverage, the coverage points may be combinations of the logical statements in the program code and Boolean values for those logical statements (e.g., one coverage point may be a logical statement in the program code having evaluated to "TRUE" and another coverage point may be the same logical statement having evaluated to "FALSE"—complete condition coverage may be each logical statement in the program code having assumed both possible truth values). As a further example, when the coverage analysis is statement coverage, the coverage points may be the statements of the program code. As should be appreciated from these examples, different coverage analyses of the same program code can evaluate different coverage points. In some embodiments, coverage points may be determined statically based at least in part on the structure of the program code. In some instances, coverage points may be associated with components of the program code.

Coverage points may be traceable to corresponding portions of the program code. For example, when a decision coverage analysis is performed on graphical program code including a switch block, coverage points corresponding to the switch block may be traceable to the switch block. For example, a technical computing environment performing the decision coverage analysis may create and/or maintain an association between the switch block and the coverage points corresponding to the switch block. This association may enable identification of the switch block from one or more of the corresponding coverage points, or identification of the one or more of the corresponding coverage points from the switch block. Similarly, a technical computing environment performing a condition coverage analysis may create and/or maintain an association between a coverage point corresponding to a Boolean value for a logical statement in textual program code and the logical statement in the textual program code.

The term "coverage point result" as used herein, is to be broadly interpreted to include data indicating that a coverage point was reached during testing of the program code. In some embodiments, program code can be instrumented to record an indication that a coverage point was reached during testing of the program code. In this manner, coverage point results can be collected during testing of the program code. As a non-limiting example, coverage settings for testing program code may specify performance of a decision coverage analysis. Accordingly, decision points in the program code may be identified. The program code may be instrumented to record if these decision points are reached during testing of the program code.

Coverage point results may be traceable to corresponding coverage points, and may be traceable to a test or test step during which the coverage point result was collected. In some embodiments, a coverage point result may include or be associated with data (e.g., stored data) indicating a context in which the coverage point result was collected. This context can include a time the coverage point result was collected.

OVERVIEW

As described herein, coverage analyses may be improved by using context information to enable subsetting of coverage information. In some embodiments, the subsetting may be performed by categorizing the coverage information and selecting coverage information in one or more of the categories. FIG. 1 depicts generation of an association 117 between test information and program information using context information 105, consistent with disclosed embodiments. Association 117 can be generated using association 111 between context information 105 and program information 101, and association 113 between test information 103 and context information 105. In some embodiments, association 115 between coverage information 107 and test information 103 and association 117 can be used to subset coverage information 107. For example, coverage information 107 can be categorized using association 117. Items of coverage information 107 in one or more of the categories can be selected. An indication of the selected items can then be displayed.

As depicted in FIG. 1, associations can be created between program information 101, test information 103, context information 105, and coverage information 107. These differing types of information are described herein. Program information 101 can include program code executable by a technical computing environment. In some embodiments, the program code can be hierarchical, including one or more components or sub-components. For example, when the program code is graphical program code, program information 101 can include a graphical model, which can include model components, such as blocks or other models. A model or block can include a set of inputs, a set of outputs, a set of states, a set of parameters, and a set of outputs. The output of a model or block can be connected to the input of another block. During execution of a model, the outputs of a model component can depend on a simulation time, the inputs to the model component, the parameters of the model component, and/or the states of the model component. Blocks can include predetermined functionality and/or user-defined functionality. For example, a block can implement common functionality, like outputting the integral or derivative of an input signal. As an additional example, a block can include user-defined textual code, such as MATLAB®, C, C++, or Fortran.

In various embodiments, program information 101 can include a description of the program code. The description can reflect a partitioning of the program code into components and subcomponents. For example, the description can be a tree, with the overall program as the root node and the components and subcomponents as child nodes. In some embodiments, the partitioning of the program code can depend on a type of coverage analysis performed during testing. For example, the leaves of the tree may correspond to coverage points defined by the coverage analysis, as described herein. The description of the program code is not limited to a particular realization. For example, the description can be realized as data stored separately from the program code (e.g., a separate file containing a hierarchy of program components, subcomponents, and coverage points). As an additional example, the description can be realized as data stored together with the program code (e.g., as metadata, labels, tags, or the like). In various embodiments, the partitioning of the program code can depend on test information 103. For example, when the program code includes a graphical model, the graphical model can be partitioned into sub-models, individual blocks, and/or groups of blocks. The extent to which the graphical model is partitioned (e.g., the granularity of the partitioning) and the particular way in which the model is partitioned, can depend on the tests performed. For example, when a test is designed or intended to test the functionality of a model component, the program code can be partitioned such that an element in the hierarchy can correspond to the tested model component. Coverage points and/or sub-elements may depend from this element in the hierarchy.

Test information 103 can include or specify data and/or instructions used to perform testing of the program code included in program information 101. Test information 103 can include or specify input information, program code parameter settings, simulation configuration settings, verification settings, and/or coverage settings for one or more tests. The tests can be dynamic tests: testing can be performed by executing the program code with specified input data, model parameters, and simulation parameters. A test may span multiple executions of the program code, and can include multiple time steps. Input settings can include or specify input data; programs, formulas, or other instructions for generating input data; and/or links to input data sources, such as paths or URLs; or connections to other computing devices, such as test and measurement equipment. Input information can be used to generate specific input data for use when performing a test. Program code parameter settings can include values for program code parameters. Such parameters can describe properties or characteristics of the program code that affect the relationship between program code inputs and program code outputs. Execution configuration settings can include values for execution parameters during a test (e.g., time step, numerical approximation strategies, data logging during execution) for use during execution of the program code. Verification settings can include statements concerning program values during execution of the program code. Such statements may concern program values during a time interval after an event, a comparison of a program value to another value, a comparison between one or more program values and one or more baseline values, or a comparison between a feature extracted from one or more program values and a template value or pattern. Such statements may further concern program timing and event ordering. Coverage settings can specify types and/or scopes of coverage to collect during a test. As described above, types of coverage can include execution coverage, decision coverage, condition coverage, modified condition/decision coverage, lookup table coverage, signal range coverage, signal size coverage, objectives and constraints coverage, saturate on integer overflow coverage, toggle coverage, relational boundary coverage, and/or other coverage measures. In some aspects, specifying coverage scope can include specifying the models or model components to collect coverage for during the test.

Test information 103 can include test sequence information. The test sequence information can specify one or more testing steps. The test sequence information can specify a testing logic, which can include actions to be performed before a test, actions performed during a test, and potential transitions to subsequent tests based on the results of the present test. The test sequence can be hierarchical. For example, a testing step can include multiple sub-testing steps. Performance of the higher level testing step can include performance of at least one of the lower level testing steps. Verification logic can be associated with any level of testing in this hierarchy, and can be expressed as one or more assessments for evaluation. For example, an assessment can be evaluated to check whether the program code satisfies design criteria (e.g., an output value is the expected value). Testing can be performed according to the test sequence information.

Context information 105 can include information explicitly or implicitly imposing conditions on the contribution of coverage point results to a coverage analysis. In some embodiments, context information 105 can include requirement information, which may include stored data specifying design requirements for a real-world system being simulated using the program code. For example, requirements information can include one or more documents specifying a hierarchy of design requirements. Such requirements can depend on the type of system. For example, when the system is a cruise control, the requirements can specify the behavior of the cruise control in response to user inputs (e.g., increment speed, decrement speed, engage cruise control, brake, or the like).

In various embodiments, context information 105 can include assessment information. Assessment information may describe conditions on program variables (e.g., a program output). Such conditions can concern one or more values of the variable (e.g., during a time interval after an event, in comparison to one or more other values, in comparison to a template value or pattern). Assessment information may support inferences regarding portions of the program code. For example, satisfaction of a condition on a program variable can imply correct functioning of portions of the program code responsible for the value of the program variable. Such portions of the program code can be identified using a dependency analysis. In some embodiments, the assessment information can include temporal assessment information. For example, assessment information can describe conditions on the temporal response of a system simulated by the program code to a triggering event, or the timing of events generated by the simulated system.

In various embodiments, context information 105 can include information imposing test criteria (e.g., the test must be performed within a certain time interval, include a certain test state, or include a certain program state). For example, context information 105 may impose a condition that coverage be obtained within an identified testing step (e.g., coverage must be collected during the second testing step in a sequence of testing steps, an "increment" test in a cruise control, or the like), program state (e.g., coverage must be collected during a particular test while a cruise control is "engaged", or the like), test state (coverage must be collected while the test is executing with a minimum time step size, or the like), or time interval (e.g., coverage must be collected between 10 and 15 seconds of a particular test), or the like.

Coverage information 107 can include information describing one or more coverage analyses specified by test information 103. In some embodiments, coverage information 107 can include coverage point results and/or coverage points for the one or more coverage analyses. In various embodiments, coverage information 107 can indicate a total number of coverage points and/or coverage point results for a coverage analysis. For example, coverage information 107 can indicate that coverage point results were recorded during testing for 150 out of 300 coverage points. In this manner, coverage information 107 can indicate the coverage point reached and the coverage points not reached during testing of the program code. For example, when performing statement coverage, the coverage information 107 can include indications of the statements in the program code that were executed and the statements in the program code that were not executed.

As shown in FIG. 1, association 117 can associate program information 101 and test information 103. Association 117 can be generated using association 113 between test information 103 and context information 105, and association 111 between context information 105 and program information 101. Association 117, together with an association 115 between coverage information 107 and test information 103, can be used to categorize coverage information 107 (e.g., into incidental or meaningful coverage information).

Association 111 can associate program information 101 and context information 105. For example, an item of context information 105 may specify a component of the program code. Association 111 can associate this item of context information with the program code. For example, context information 105 can include design requirements. These design requirements can include a high level design requirement linked to a low-level design requirement. Association 111 can include a link between the low-level design requirement and a portion of the program code. For example, when the program code is graphical program code, the low-level design requirement can be linked to a component of a graphical model. In this example, the graphical model can be generated or created in compliance with the design requirements.

Association 113 can associate context information 105 and test information 103. For example, an item of context information 105 may impose a condition on the contribution of coverage point results to a coverage analysis. Association 113 can associate this item of context information 105 with a test specified by test information 103. In some embodiments, the test may be configured to satisfy the condition imposed by the item of context information 105. For example, association 113 can associate a requirement specified by context information 105 and a test specified by test information 103, the test corresponding to the requirement. As an additional example, an item of context information 105 can impose a condition on a program variable (e.g., a program output) during a test. The condition can concern one or more values of the variable (e.g., during a time interval after an event, in comparison to one or more other values, in comparison to a template value or pattern). Alternatively or additionally, the item of context information 105 can impose a condition on program timing and event ordering (e.g. the temporal response of a system simulated by the program code to a triggering event, or the timing of events generated by the simulated system). Association 113 can associate the item of context information 105 with a test specified by test information 103, the test configured to verify the condition imposed on the program variable. As a further example, an item of context information 105 can impose a test criterion (e.g., the test must be performed within a certain time interval, include a certain test state, or include a certain program state). Association 113 can associate the item of context information 105 with a test specified by test information 103, the test configured to satisfy the test criterion. For example, test information 103 may configure the test to be performed within a certain time interval, include a certain test state, or include a certain program state.

Association 115 can associate test information 103 and coverage information 107. As described above, coverage information 107 can include coverage point results collected during a test specified by test information 103. As described above, such coverage points may be traceable to the tests during which they were collected. Thus, in some aspects, association 115 can associate a test specified by test information 103 with coverage point results collected during the test. For example, when test information 103 specifies a test sequence include two testing steps, association 115 can associate the first testing step with coverage collected during the first testing step and the second testing step with coverage collected during the second testing step. As an additional example, in some embodiments, association 115 can associate the test sequence with coverage collected during both testing steps.

Association 117 can associate program information 101 and test information 103. Association 117 may enable categorization of coverage point results collected during testing, consistent with disclosed embodiments. For example, association 117 may associate a component of the program code and a test specified by test information 103. The test may be associated by association 115 with coverage information 107. As described above, coverage information 107 may include coverage point results traceable to components of the program code. In some embodiments, a coverage point result may be categorized (e.g., into incidental or meaningful coverage information) based on whether (i) association 117 associates the test and the component and (ii) both test and the component are traceable to the coverage point. For example, when a coverage point result is traceable to a test specified by test information 103 and a component of the program code, and association 117 associates the test and the component, then the coverage point may be categorized as meaningful coverage.

Association 117 may be generated based on associations between program information 101 and test information 103 through context information 105 (e.g., association 111 and association 113). In some embodiments, association 117 may be generated when association 111 and association 113 include associations with the same items of context information 105, or differing items of context information 105 that are associated.

Association 117 may be generated when association 111 and association 113 associate the program information 101 and the test information 103, respectively, with the same item of context information 105. For example, context information 105 may include a requirement. Association 111 may associate a component of the program code with the requirement. Association 113 may associate the requirement with a test. Based on these associations, association 117 may be generated to associate the component of the program code with the test.

Association 117 may be generated when association 111 and association 113 associate the program information 101 and the test information 103, respectively, with differing items of context information 105. In such embodiments, the differing items of context information 105 may be associated. As a non-limiting example, context information 105 may include a hierarchy of design requirements for a cruise control system. The design requirements may include a first requirement (e.g., that the set speed of a cruise control increment when an increment button is pressed) and a second requirement (e.g., that the set speed increment by one mile-per-hour each time the button is pressed). The first requirement may be associated with the second requirement. For example, the second requirement may be a sub-requirement of the first requirement. Association 111 may associate a component of the program code with the first requirement, and association 113 may associate a test with the second requirement. Association 117 may be generated based on the association between the first and second requirements, association 111 and association 113.

As would be appreciated by one of skill in the art, association 111 and association 113 may associate a component of the program code with a test through associations with multiple items of context information 105. In some embodiments, association 117 may include a single association corresponding to the associations with multiple items of context information 105. In various embodiments, association 117 may include multiple associations corresponding to the associations with multiple items of context information 105.

The associations described above with regards to FIG. 1 (e.g., the associations included in association 111, association 113, association 115, and association 117) can be determined by a programming environment (e.g., a technical computing environment as described herein). For example, the programming environment can be configured to receive an association from another program, or retrieve an association from a computer readable medium (e.g., a computer memory). The association can be received or retrieved from one or more devices hosting the programming environment, or another device (e.g., a server communicatively connected to one or more devices hosting the programming environment). As an additional example, the programming environment can be configured to create an association. The association can be created using data and/or instructions received from another program, or retrieved from a computer readable medium, as described above.

The associations described above with regards to FIG. 1 can be maintained as stored data, such as key-value pairs stored by a programming environment (e.g., a technical computing environment, as described herein). The associations can be created by a user. For example, a user may interact with a graphical user interface to create associations between components of a model and requirements, or between requirements and tests. Alternatively, associations can be created automatically. For example, a programming environment may be configured to create tests corresponding to design requirements and associate the created tests with the corresponding design requirements. As an additional example, the technical computing environment can be configured to automatically associate tests with coverage information generated using the tests. The associations described above can include one-to-one, one-to-many, or many-to-many linkages. For example, an item of context information 105 can be associated with multiple tests specified by test information 103. As an additional example, a component of the program code can be associated with multiple items of context information 105.

Example Environment Arrangement

Figure 2:
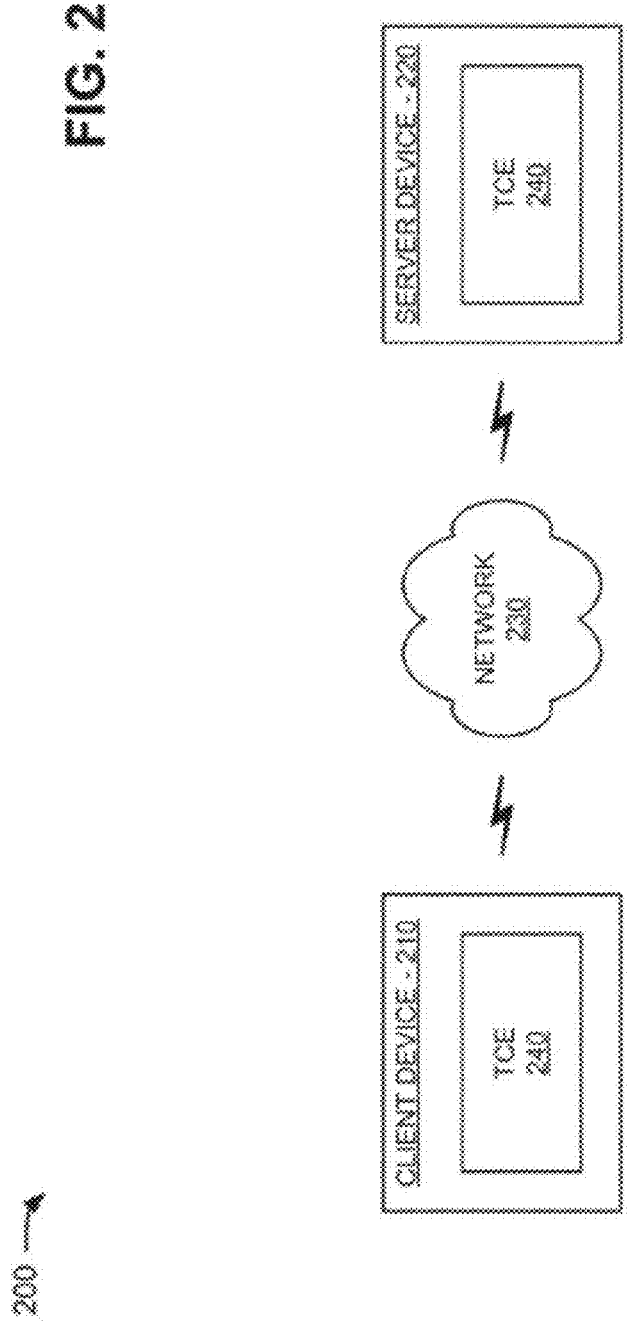
FIG. 2 depicts an exemplary environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a result of evaluating program code). For example, client device 210 may include a computing device, such as a desktop computer, a laptop computer, a tablet computer, a handheld computer, a server, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), determining information associated with the program code (e.g., determining help information associated with the program code), or the like. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; SCADE Suite by Ansys; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results corresponding to program code displayed in the code editor portion. TCE 220 may provide one or more correspondence indicators that indicate a correspondence between different portions of program code and respective results associated with the different portions of program code. TCE 220 may permit a user to input one or more configuration parameters that may control, for example, a manner in which a result is displayed and/or provided, a manner in which program code is displayed and/or provided, a manner in which a correspondence indicator is displayed and/or provided, or the like.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, a handheld computer, a mobile device, or a similar device. In some implementations, server device 230 may include an embedded device, such as a microcontroller (e.g., an Arduino microcontroller, a device utilizing an ARM architecture, a device utilizing an x86 architecture, etc.). In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel) and may provide respective results of evaluating the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Example Device Architecture

Figure 3:
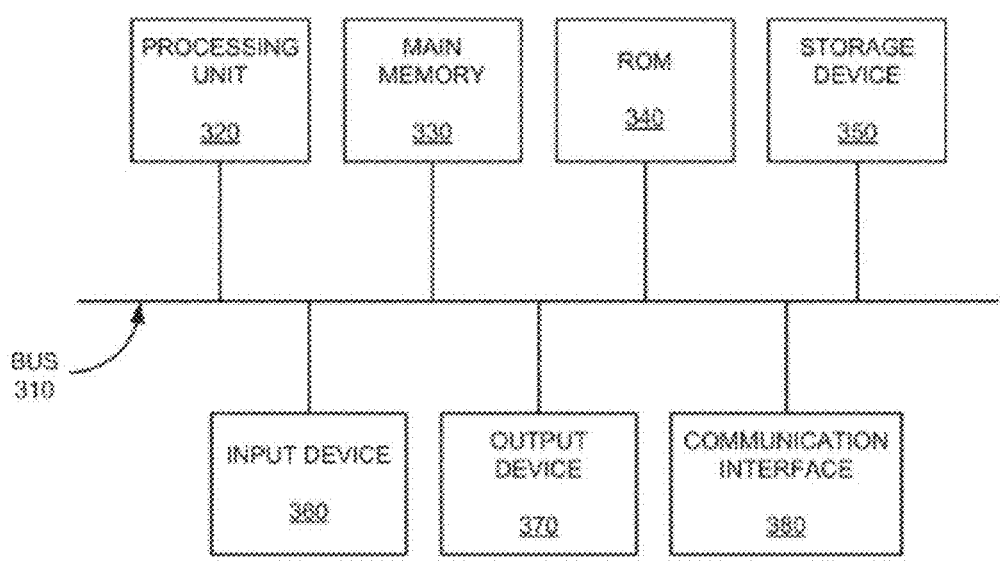
FIG. 3 depicts an exemplary schematic of one or more of the devices of the environment depicted in FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform one or more processes described herein. Device 300 may perform these processes in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 380. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Exemplary Graphical Model

Figure 4:
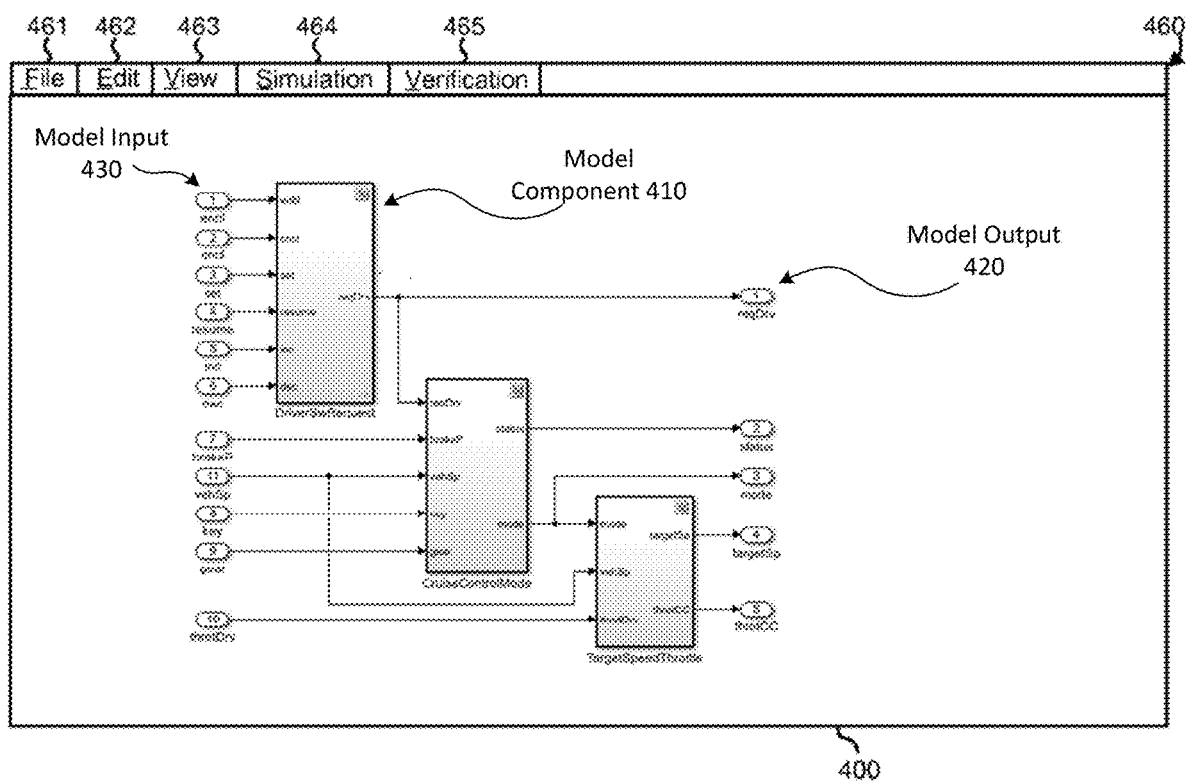
FIG. 4 depicts an exemplary graphical user interface containing a model suitable for analysis according to the method of FIG. 1.

FIG. 4 depicts an exemplary graphical user interface containing a model suitable for analysis according to the method of FIG. 1. The graphical interface may include a model area 400 in which a model (e.g., constructed of blocks) can be built by a user. The model described below as being constructed in model area 400 represents only one example of a model that may be generated.

A user may select blocks and place the blocks in model area 400. For example, a user may select a block from a block library and may move the block into model area 400 using a pointing device, such as a mouse. A block may represent functionality and/or data and may be defined using any of a number of possible programming languages. A block may also itself be defined by one or more other blocks.

In some implementations, a model may include elements other than graphical blocks. For example, a model may additionally include user created external source code and/or state diagrams.

In the example of FIG. 4, model area 400 includes a model simulating the behavior of a cruise control system of an automobile. The model may include a number of blocks (e.g., model component 410). Each of the blocks may represent a primitive element from which a model may be built, or a sub-model that may in turn contain additional sub-models or primitives. The model shown in FIG. 4 may have been generated by a user placing each of the blocks in model area 400, connecting inputs (e.g., model input 430) and outputs (e.g., model output 420) to the blocks, creating logical connections between the blocks, and configuring parameters relating to the blocks.

Menu bar 460 may include a number of graphically selectable menu options, such as a file menu option 461, an edit menu option 462, a view menu option 463, a simulate menu option 464, and a verification option 465. Each menu option may correspond to, for example, a user-selectable command or a sub-menu with additional commands.

As shown in FIG. 4, a first model component (e.g., model component 410) may handle driver inputs (e.g., enable, cancel, set, resume, increment speed or decrement speed) received by the cruise control system. A second model component may handle the request from the driver and information from the car (e.g. brake pressure, vehicle speed, key presence, gear) and provide a status output and a cruise control mode. A third component of the model may receive the current throttle settings, the vehicle speed, and the cruise control mode and output a target speed and a throttle control signal.

Figure 8:
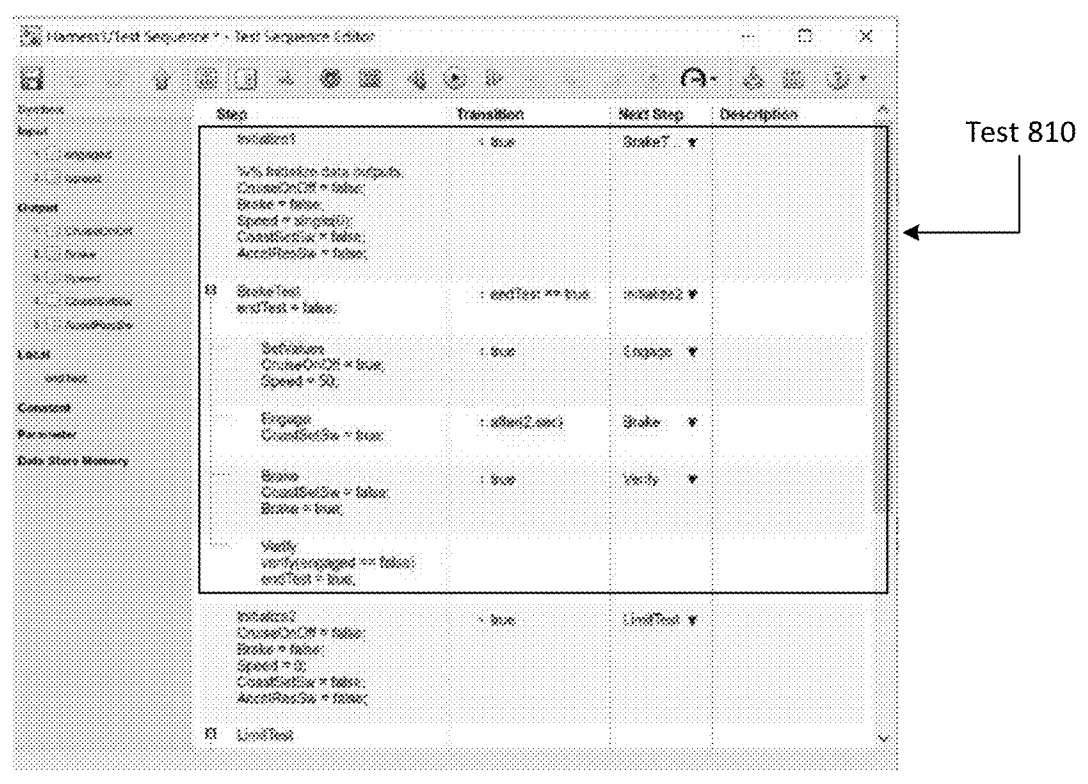

A user, after constructing the model represented by the blocks, may instruct, via simulate menu option 464, the technical computing environment to simulate (e.g., execute or run) the model. The simulation can be performed using testing information 103, as described with regards to FIG. 1. For example, testing may be performed according to testing scenarios with specified values for model inputs over time. FIG. 8 displays an exemplary test scenario for the model depicted in FIG. 4, showing multiple steps in test 810, model input parameter values, specified transitions between test states, and logical tests performed on model outputs. Model coverage may be collected during the testing. As described above with regards to FIG. 1, the model can be represented by a hierarchy of elements and coverage points. The technical computing environment can be configured to associate this hierarchy with a subset of the coverage information collected during testing. The graphical user interface may then display this subset of the coverage information.

Exemplary Association of Coverage Information with Program Information

Figure 5:
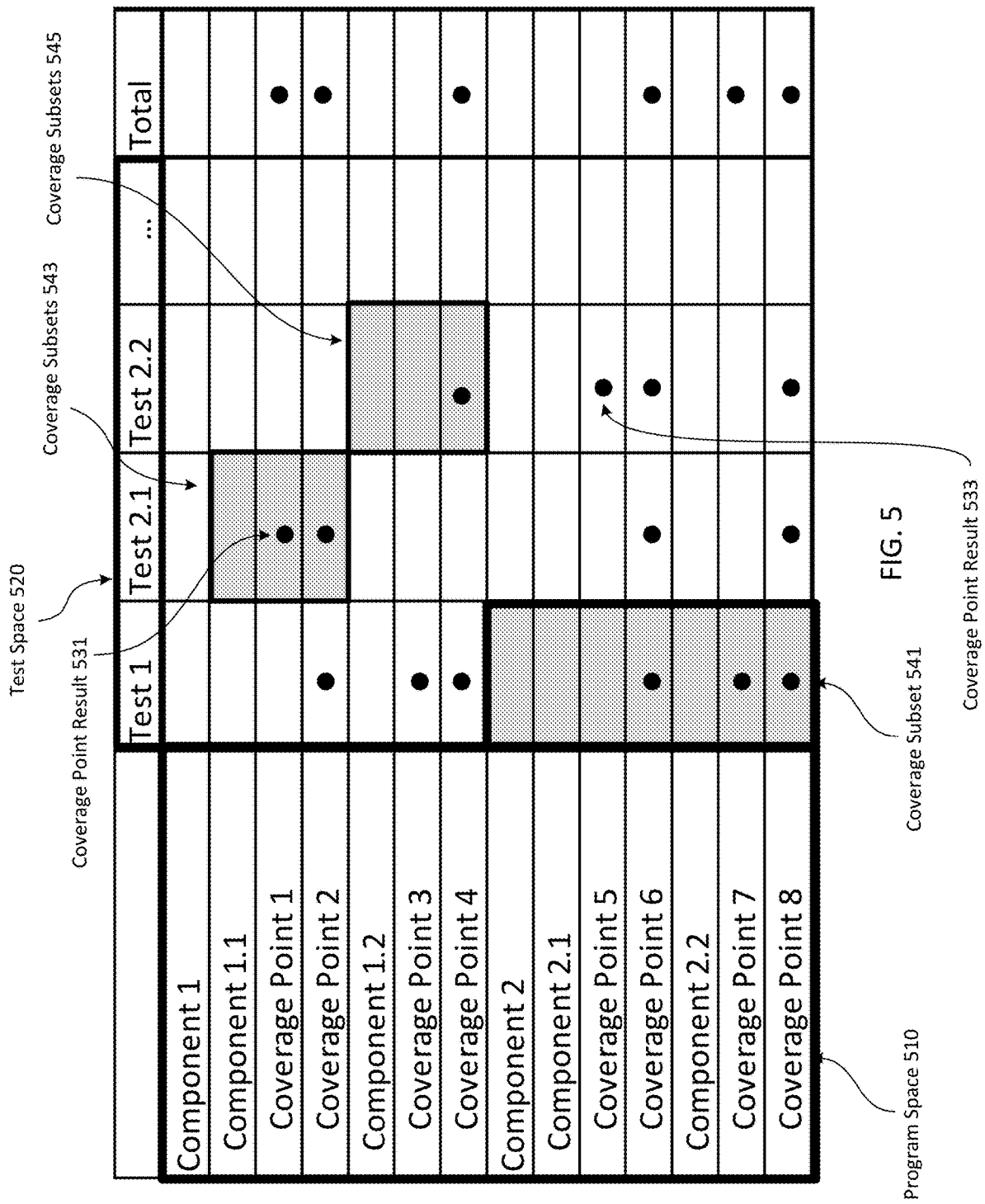
FIG. 5 depicts an exemplary association between coverage information and program information.

FIG. 5 depicts an exemplary categorization of coverage information 107, consistent with disclosed embodiments. In some embodiments, the depicted categorization may be maintained as a data structure (e.g., as a table stored in a memory, a database entry, a structure, or the like). In various embodiments, the depicted categorization may be maintained as attributes of or associated with coverage point results (e.g., a coverage point result can be associated with a test, a coverage point, and a category) in coverage information 107. The disclosed embodiments are not intended to be limited to a particular representation of the associations depicted in FIG. 5.

In some embodiments, program space 510 may comprise a hierarchy of elements of the program code, as described above with regards to FIG. 1. For example, as shown, the program code has been partitioned into components 1 and 2, where component 1 includes sub-components 1.1 and 1.2 and component 2 includes sub-components 2.1 and 2.2. To continue this example, when the program code is a graphical model, component 1 may be a sub-model and component 1.1 may be a block in the sub-model. Program space 510 further includes coverage point 1 through coverage point 8. As described above, the coverage points may depend on the type of coverage analysis being performed. The coverage points may be associated with elements of the hierarchy of program code elements. For example, coverage point 1 and coverage point 2 are associated with component 1.1. In some embodiments, program space 510 may include multiple sets of coverage points corresponding to multiple types of coverage analyses.

In some embodiments, test space 520 can indicate the tests specified by test information 103. For example, when test information 103 specifies a first test (test 1) and a second test including two testing steps (test 2.1 and test 2.2), the test space can indicate test 1, test 2.1 and test 2.2. As shown, coverage point results reached during a test may be traceable to that test. For example, coverage point result 531 may be traceable to the first testing step of the second test (e.g., test 2.1). A granularity of the traceability may depend on test information 103 and/or the context information 105. For example, context information 105 may impose a condition that coverage be obtained within an identified testing step (e.g., coverage must be collected during the second testing step in a sequence of testing steps, an "increment" test in a cruise control, or the like), program state (e.g., coverage must be collected during a particular test while a cruise control is "engaged", or the like), test state (coverage must be collected while the test is executing with a minimum time step size, or the like), or time interval (e.g., coverage must be collected between 10 and 15 seconds of a particular test), or the like. In such embodiments, coverage point results may be traceable to a particular testing step (as shown in FIG. 5); or program state, test state, or time interval (not shown in FIG. 5).

In some embodiments, a coverage point result (e.g., coverage point result 531 or coverage point result 533) may be associated with a coverage point in program space 510 and a test in test space 520 (or test step, program state, test state, time interval, or the like, depending on context information 105).

In some embodiments, a coverage subset (e.g., one of coverage subsets 541, 543, or 545) may indicate that association 117 associates a component of the program code with a test, as described above with respect to FIG. 1. For example, test 2.1 may be associated with component 1.1 (e.g., coverage subset 543) and test 2.2 may be associated with component 1.2 (e.g., coverage subset 545). As an additional example, test 1 may be associated with component 2 (e.g., coverage subset 541). As shown, association 117 may associate elements at any level of program space 510 (e.g., component or sub-component) with tests at any granularity of the test space 520 (e.g., test or testing step). In some embodiments, coverage point results may be categorized based on whether they belong to a coverage subset. For example, coverage point result 531 belongs to coverage subset 543, while coverage point 533 does not belong to any coverage subset. In some embodiments, coverage point 531 may be categorized as meaningful, or non-incidental, coverage, while coverage point 533 may be categorized as non-meaningful, or incidental, coverage. Such categorization may be used to exclude coverage point results collected during a test not designed or intended to test a particular component of the program code. As would be appreciated by one of skill in the art, the disclosed embodiments are not intended to be limited to a particular representation of coverage subsets, or membership of coverage point results in coverage subsets.

In some embodiments, coverage may be cumulated across test space 520. As shown, in some embodiments, a coverage point result may be indicated for a coverage point when a coverage point result belonging to the coverage subset is indicated for any test in test space 520. Accordingly, in this example, coverage point result 531 contributes to the total coverage, while coverage point result 533 does not contribute to the total coverage. In this manner, by refining the coverage analysis to coverage subsets defined by associations 117, incidental coverage may optionally be excluded from the coverage analysis.

Exemplary Context Information

Figure 6:
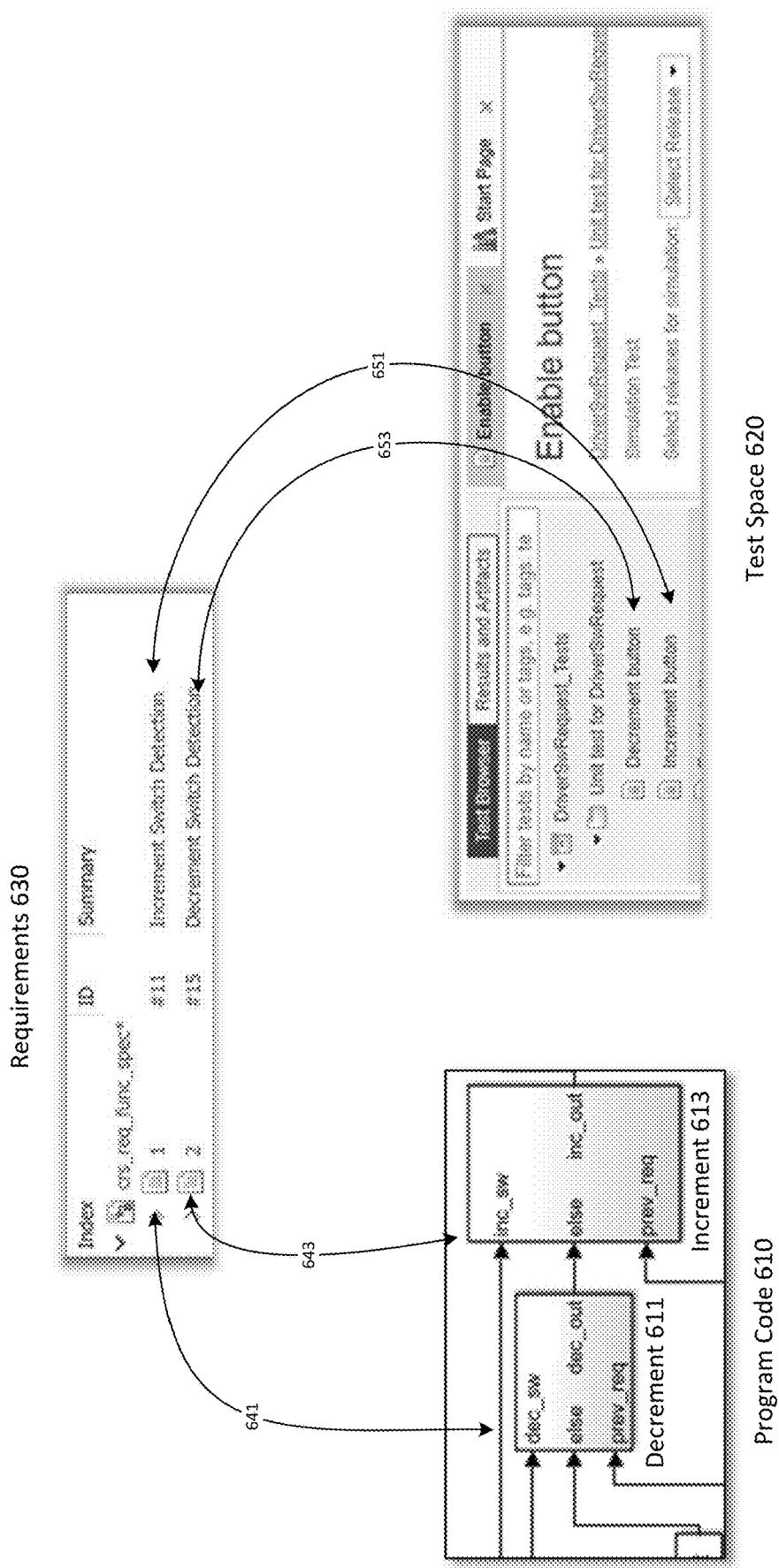
FIG. 6 depicts exemplary requirement context information.

FIG. 6 depicts exemplary requirement context information, consistent with disclosed embodiments. This requirement context information can be used to associate coverage information with program information, as described above with respect to FIG. 1. As shown, program code 610 comprises graphical program code, and includes two subcomponents decrement 611 and increment 613 of a component "DriverSWRequest." This example is not intended to be limiting. For example, program code 610 can additionally or alternatively include textual program code. A test associated with the requirement context information can be automatically created based on the requirement context information, in some embodiments, or manually created by a user, in various embodiments. Association 113 can be manually or automatically created. For example, a user may manually associate an item of the requirement context information with a test.

Test space 620 comprises a unit test for the component DriverSWRequest. This unit test includes two testing steps "decrement" and "increment". The technical computing environment can execute these tests to test program code 610. As shown, the decrement testing step can be designed and/or intended to test the decrement subcomponent, while the increment testing step can be designed and/or intended to test the increment subcomponent. In some embodiments, coverage collected during failed tests may not contribute to the coverage analysis.

Requirements 630 can include design requirements for the program code 610. The design requirements can include a first requirement for increment switch detection functionality and a second requirement for decrement switch detection functionality. As shown, the requirements in requirements 630 can be associated with program 610. The first requirement in requirements 630 for increment switch functionality can be associated (e.g., by association 641) with the increment subcomponent of program code 610. For example, the increment subcomponent can implement the first requirement. The second requirement in requirements 630 for decrement switch functionality can be associated (e.g., by association 643) with the decrement subcomponent of program code 610. For example, the decrement subcomponent can implement the second requirement. As further shown, the requirements in requirements 630 can be linked to tests in test space 620. The first requirement can be associated (e.g., by association 651) with the increment testing step. For example, the increment testing step can verify the first requirement. The second requirement can be associated (e.g., by association 653) with the decrement testing step. For example, the decrement testing step can verify the second requirement. In some embodiments, associations 641 and 643 can be included in associations 111 and associations 651 and 653 can be included in associations 113, as described above with respect to FIG. 1.

The technical computing environment can collect coverage point results during execution of the unit test for component DriverSWRequest. The collected coverage point results may be associated with the test steps during which the coverage point results were collected. For example, coverage point results collected during the decrement testing step may be linked to the decrement testing step. The technical computing environment can be configured to generate an association between the decrement testing step and the decrement subcomponent of the program code 610, as described above with respect to FIG. 1.

As an additional example, the unit test for component DriverSWRequest may be associated with a higher-level requirement from which the first requirement and second requirement both derive (not shown). Accordingly, the technical computing environment can be configured to create an association between the decrement subcomponent and the overall unit test for component DriverSWRequest, and between the increment subcomponent and the overall unit test for component DriverSWRequest. These associations can be created based on the association between the unit test for component DriverSWRequest, the association between the higher-level requirement and the first and second requirements, and the individual associations between the first and second requirements and the increment and decrement subcomponents.

Figure 7:
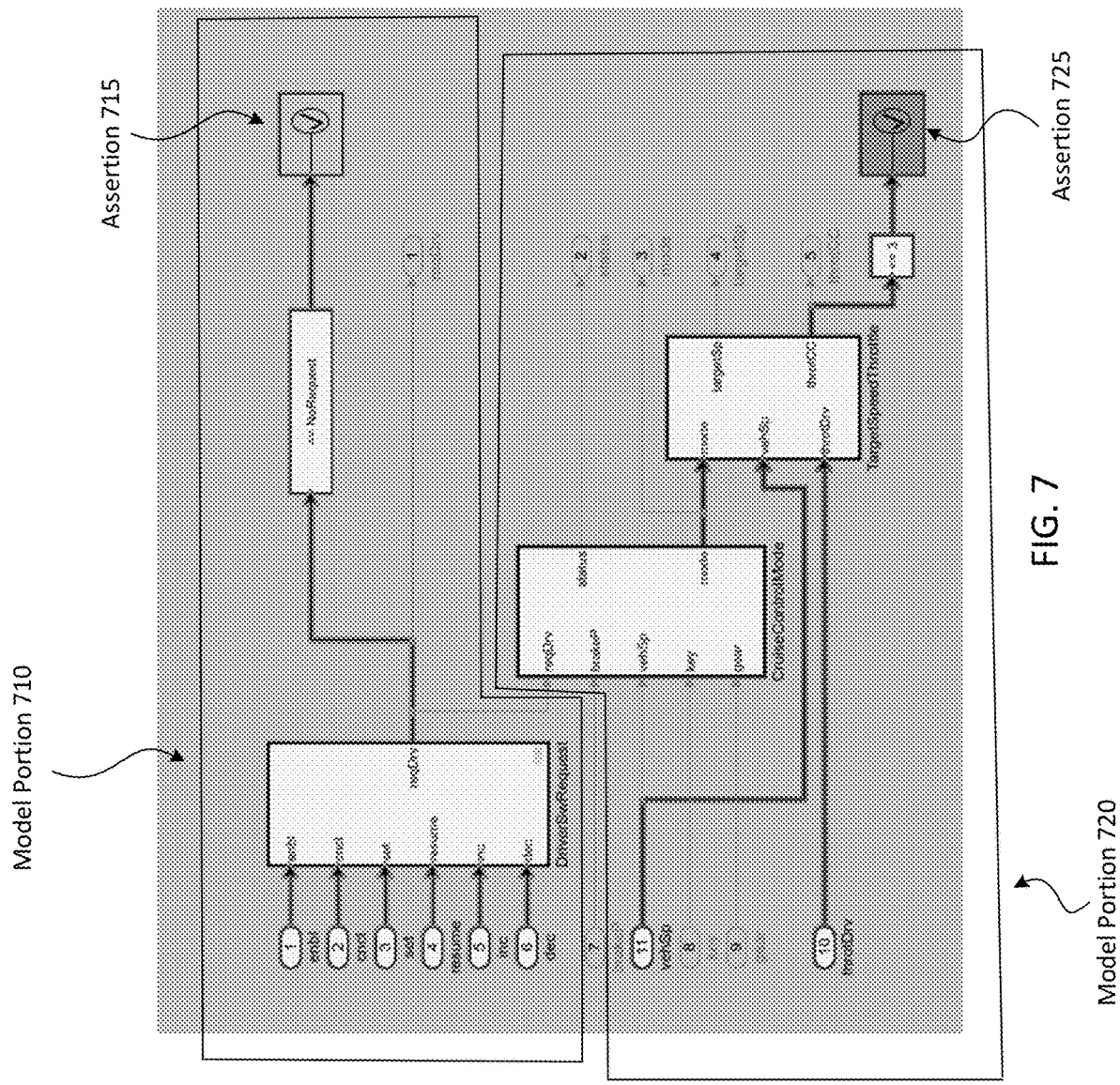
FIG. 7 depicts an exemplary application of assessment context information.

FIG. 7 depicts an exemplary application of assessment context information, consistent with disclosed embodiments. The assessment information can be included in context information 105, described above with respect to FIG. 1. As a non-limiting example, a first item of the assessment information can impose a first condition on the output of model portion 710 and a second condition on the output of model portion 725. As shown, the dependency context information concerns graphical program code, but the disclosed embodiments are not intended to be so limited. For example, the disclosed embodiments can additionally or alternatively be performed using textual program code. A test associated with the assessment context information can be automatically created based on the assessment context information, in some embodiments, or manually created by a user, in various embodiments. Association 113 can be manually or automatically created. For example, a user may manually associate an item of the assessment context information with a test.

In some embodiments, the assessment information can be associated with test information 103. For example the assessment information can be associated with tests specified by test information 103 that verify the conditions imposed on the outputs of model portion 710 and model portion 720. For example, association 113 can associate the first item of assessment information with a first test that verifies assertion 715, and associate the second item of assessment information with a second test that verifies assertion 725.

In various embodiments, the assessment information can be associated with program information 101. For example, performance of a dependency analysis, according to known methods, may determine that verifying satisfaction of the first condition verifies correct functioning of model portion 710 and that verifying satisfaction of the second condition verifies correct functioning of model portion 720. Association 111 can therefore associate the first item of assessment information with components of the program code in model portion 710 and associate the second item of assessment information with components of the program code in model portion 720.

In various embodiments, association 117 can associate the components of the program code in model portion 710 with the first test that verifies assertion 715, and can associate the components of the program code in model portion 720 with the second test that verifies assertion 725, based on association 111 and association 113. Coverage point results collected during the first test and associated with components of model portion 710 can be categorized based on association 117, as described above with respect to FIG. 1. For example, these coverage point results can be categorized as meaningful. Coverage point results collected during the first test and associated with components of model portion 720 can be categorized based on an absence of an association between the first test and components of model portion 720. For example, these coverage point results can be categorized as incidental and excluded from an analysis of the coverage provided by the first and second tests. Should either the first or second test fail, for example because the output does not match the asserted value, coverage collected during that test may not contribute to the coverage analysis.

FIG. 8 depicts an exemplary application of test criteria context information, consistent with disclosed embodiments. The test criteria context information can be included in context information 105. Association 113 can associate the test criteria context information with one or more tests specified by test information 103. Association 117 can be generated using association 113, consistent with disclosed embodiments. A test associated with the test criteria context information can be automatically created based on the test criteria context information, in some embodiments, or manually created by a user, in various embodiments. Association 113 can be manually or automatically created. For example, a user may manually associate an item of the test criteria context information with a test.

As an illustrative, non-limiting example, test 810 includes an initialization step and a braketest step. The braketest step includes various sub-steps, such as a setvalues step, an engage step, a brake step, and a verify step. In some embodiments, conditions imposed on testing the program code may concern a test state, program state, test sequence, or performance of the test. For example, when the program code simulates a cruise control system, the condition may specify that the test be a braking test. In this example, association 113 can associate the test criteria context information with the brake sub-step. As a further example, the condition may require testing occur with the program in a particular state. For example, the test criteria may require that coverage point results be collected when "CoastSetSW=TRUE" in test 810. In this example, association 113 can associate the test criteria context information with the engage sub-step. The test criteria may involve a sequence of the test. For example, the test criteria may require a test be performed second in a sequence of tests. In this example, association 113 can associate the test criteria context information with the braketest step. In some embodiments, the test criteria may concern the performance of the test. For example, the test criteria may require testing occur during simulations that did not exhibit anomalous solver behavior. As a non-limiting example of such behavior, a solver of the technical computing environment may be configured with a variable time-step. The solver may sometime get "stuck", repeatedly reducing the size of the variable time-step. Such behavior may trigger an error in a watchdog timer that monitors the status of the simulation. Association 113 can associate a test including such a watchdog timer with a corresponding item of test criteria context information.

As shown in FIG. 8, test 810 includes a verification sub-step. Association 113 can associate test 810, or merely the verify sub-step of test 810, with an item of assessment context information. Performance of a dependency analysis can identify components of the program code verifiable based on the verification of the engaged value in the verification sub-test. Association 111 can associate the identified components with the item of assessment context information. Association 117 can associate test 810, or merely the verify sub-step of test 810, with the identified components based on association 111 and association 113.

Figure 9:
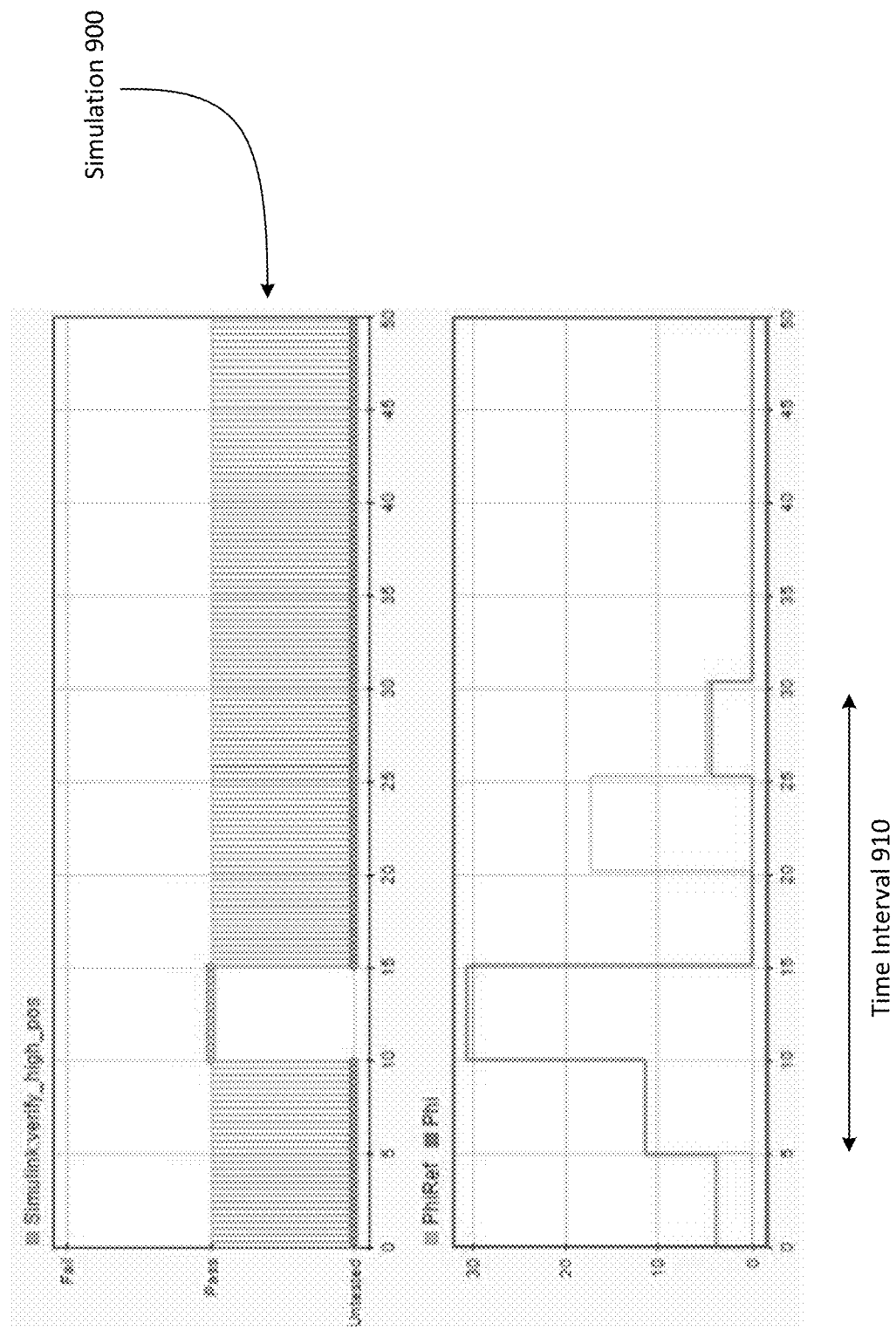
FIG. 9 depicts an exemplary application of temporal assessment context information.

FIG. 9 depicts an exemplary application of temporal assessment context information, consistent with disclosed embodiments. The temporal assessment context information can be included in context information 105. The temporal assessment context information can describe conditions on the temporal response of a system simulated by the program code to a triggering event, or the timing of events generated by the simulated system.

Association 113 can associate the temporal assessment context information with one or more tests specified by test information 103. Association 117 can be generated using association 113, consistent with disclosed embodiments. A test associated with the temporal assessment context information can be automatically created based on the temporal assessment context information, in some embodiments, or manually created by a user, in various embodiments. Association 113 can be manually or automatically created. For example, a user may manually associate an item of the temporal assessment context information with a test.

As shown in FIG. 9, simulation 900 depicts the result of running a test on program code. The output of a verification block is shown above and the values of two inputs to the verification block, PhiRef and Phi, are shown below. The output of the verification block is verified as correct between 10 and 15 seconds in the test. In this non-limiting example, an item of temporal assessment context information can impose a time interval condition on testing, refining the coverage analysis to coverage point results collected within time interval 910. Association 113 can associate the portion of the test within the time interval with the item of temporal assessment context information.

As shown in FIG. 9, the test run on the program code verifies the value of PhiRef. Performance of a dependency analysis can identify components of the program code verifiable based on the verification of PhiRef. Association 111 can associate the identified components with an item of assessment context information. Association 117 can associate the identified components with the portion of simulation 900 within time interval 910, based on the association between the item of temporal assessment context information and the portion of simulation 900 within time interval 910, and the association between the item of assessment context information and the identified components.

Exemplary User Interfaces

FIG. 10A depicts an exemplary method 1000 for sub-setting coverage information, consistent with disclosed embodiments. For convenience of description, method 1000 is described herein as performed by server device 220. However, this description is not intended to be limiting, as method 1000 may be individually or cooperatively performed by one or more of client device 210, server device 220, or additional client or server devices. Furthermore, the order of steps described with regards to FIG. 10A is not intended to be limiting. For example, coverage information may be generated before receiving context information.

Method 1000 can include obtaining program information, test information, and context information in step 1010, consistent with disclosed embodiments. The program information can include program code, such as textual code and/or graphical code. The test information can include or specify data and/or instructions used to perform testing of the program code. The context information can include information concerning the program information and/or information concerning the testing information. For example, the context information can include requirement information, dependency information, and/or testing criteria. Each of the program information, test information, and context information can be obtained from a single source or from multiple sources, at once or over time, automatically or in response to user input.

Server device 220 can obtain one or more of the program information, test information, and context information from a single source or from multiple sources, consistent with disclosed embodiments. For example, server device 220 can receive one or more of the program information, test information, and context information from client device 210. Additionally or alternatively, server device 220 can receive the program information, test information, and/or context information from multiple devices, such as other client or server devices in communication with server device 220. Additionally or alternatively, server device 220 can retrieve program information, test information, and/or context information from a memory accessible to server device 220 (e.g., a computer memory of server device 220 or another device, or a non-transitory computer readable medium, such as a USB memory). Additionally or alternatively, server device 220 can create program information, test information, and/or context information using data and/or instructions obtained by server device 220.

Server device 220 can obtain the program information, test information, and/or context information at once or over time, consistent with disclosed embodiments. For example, server 220 may receive and store some of the test information, program information, and/or context information from a first source, and then subsequently receive additional test information, program information, and/or context information from another source at another time. As an additional example, server device 220 can receive test information from another device at a first time, retrieve context information from a memory accessible to server device 220 at a second time, and create program information using data and/or instructions obtained by server device 220 at a third time. Server device 220 can also obtain the program information, test information, and context information in any order or sequence, consistent with disclosed embodiments.

Server device 220 can obtain the program information, test information, and/or context information through interactions with one or more users. For example, a user may provide information including at least a portion of one or more of the program information, test information, and context information. The server can be configured to provide commands to display a user interface, such as a graphical user interface or a command line user interface, to the user. The user may interact with the user interface to provide the information.

Method 1000 can include generating coverage information by testing the model according to the test information in step 1020, consistent with disclosed embodiments. For example, server 220 can perform tests or simulations of the program code using the data and/or instructions specified in the test information. During testing or simulation, the technical computing environment can be configured to collect coverage information. The coverage information collected may be determined by the testing information, or by data or instructions received from a user. For example, the testing information may specify one or more types of coverage analysis. As an additional example, server 220 may provide instructions to display, on a user interface, an option to select one or more types of coverage analysis. A user may interact with the user interface to provide a selection of one or more of the types of coverage analysis. In response to the selection, the program code may be instrumented to collect coverage for the selected types of coverage analyses, according to known methods. The coverage information generated during each test may be traceable to that test. Furthermore, the technical computing environment may be configured to record metadata describing the test, such as when the test was performed, whether the test was part of a sequence of tests, the outcome of any verifications performed as part of testing, or any other information necessary to associate at least a portion of the test information with the context information.

Method 1000 can include determining a subset of the collected coverage information using the context information in step 1030, consistent with disclosed embodiments. As described below with respect to FIG. 10B, the technical computing environment can be configured to generate associations between tests and portions of the program information. For example, the program information can include a hierarchical description of the program code that partitions the program code into components and subcomponents. The specifics of the partition, and thus the hierarchy, can depend on the testing information. Coverage points may be associated with the portions of the program information. For example, coverage points may be associated with the components and subcomponents of the program code. The coverage points may correspond to a coverage analysis performed in step 1020, during testing of the program code according to the testing information. To continue the example, the coverage information can include coverage points results collected during performance of tests according to the testing information. The technical computing environment can be configured to determine coverage points results associated with tests and portions of the program information that are, in turn, associated by associations generated by the technical computing environment. The technical computing environment can categorize such coverage points based on the presence of an association between the tests and portions of the program information (e.g., as meaningful or non-incidental coverage). In some embodiments, the technical computing environment can be configured to determine the subset of the coverage points based on the categorization of the coverage point results. In various embodiments, the technical computing environment can be configured to determine the subset of the coverage information based on the presence or absence of an association between a test associated with the coverage information and a portion of the program information association with the coverage information.

Method 1000 can include displaying in step 1040 an indication of the subset of the coverage information generated in step 1030, consistent with disclosed embodiments. For example, server 220 can be configured to provide instructions to display an indication of the subset of the coverage information 1040 to a user. The display can be provided using a graphical user interface, such as the exemplary graphical user interfaces shown in FIGS. 11A to 12B. In some embodiments, the display can include a graphical representation of the program code. For example, components of the program code can be displayed in the graphical user interface. One or more visual characteristics can indicate a degree of coverage associated with the components of the program code. In response to user input, the user interface can be configured to change a depiction of one or more components in the graphical representation of the program code.

The subset of the coverage information generated in step 1030 can be displayed at any level of aggregation. For example, the display can indicate a number of coverage point results collected during testing of the program code and/or a proportion of the coverage points for which coverage point results were collected during testing of the program code for the program code as a whole, or for any component or subcomponent of the program code. The subset can be further refined to display an indication of coverage point results collected during performance of one or more tests. For example, when the testing included performance of a first test and a second test, the display can indicate a proportion of the coverage points results collected during performance of the first test. The subset can be further refined to display an indication of the collected coverage points results associated with a particular item of context information. For example, the display can indicate a number of coverage point results collected and/or a proportion of the coverage points for which coverage point results were collected that are associated with a design requirement, dependency relationship, or testing criterion (e.g., associated through one or more intermediate associations as described above with regards to FIG. 1). The subset can be further refined to display an indication of the collected coverage point results associated with a particular element in the hierarchical description of the program code. For example, when the program code includes graphical program code containing blocks, the display can indicate a number of coverage point results collected and/or a proportion of the coverage points for which coverage point results were collected that are associated with a block within the graphical programming code.

The user can interact with server 220 to modify the display of coverage information, consistent with disclosed embodiments. For example, in response to input from a user, server 220 can provide instructions to switch between displaying an indication of all coverage information and displaying an indication of the subset of coverage information generated in step 1030. As a further example, in response to input from a user, server 220 can provide instructions to refine the displayed coverage information to coverage information associated with a particular element of the program code, coverage information associated with a particular item of context information, or coverage information associated with a particular test, or any combination of the foregoing.

Figure 10B:
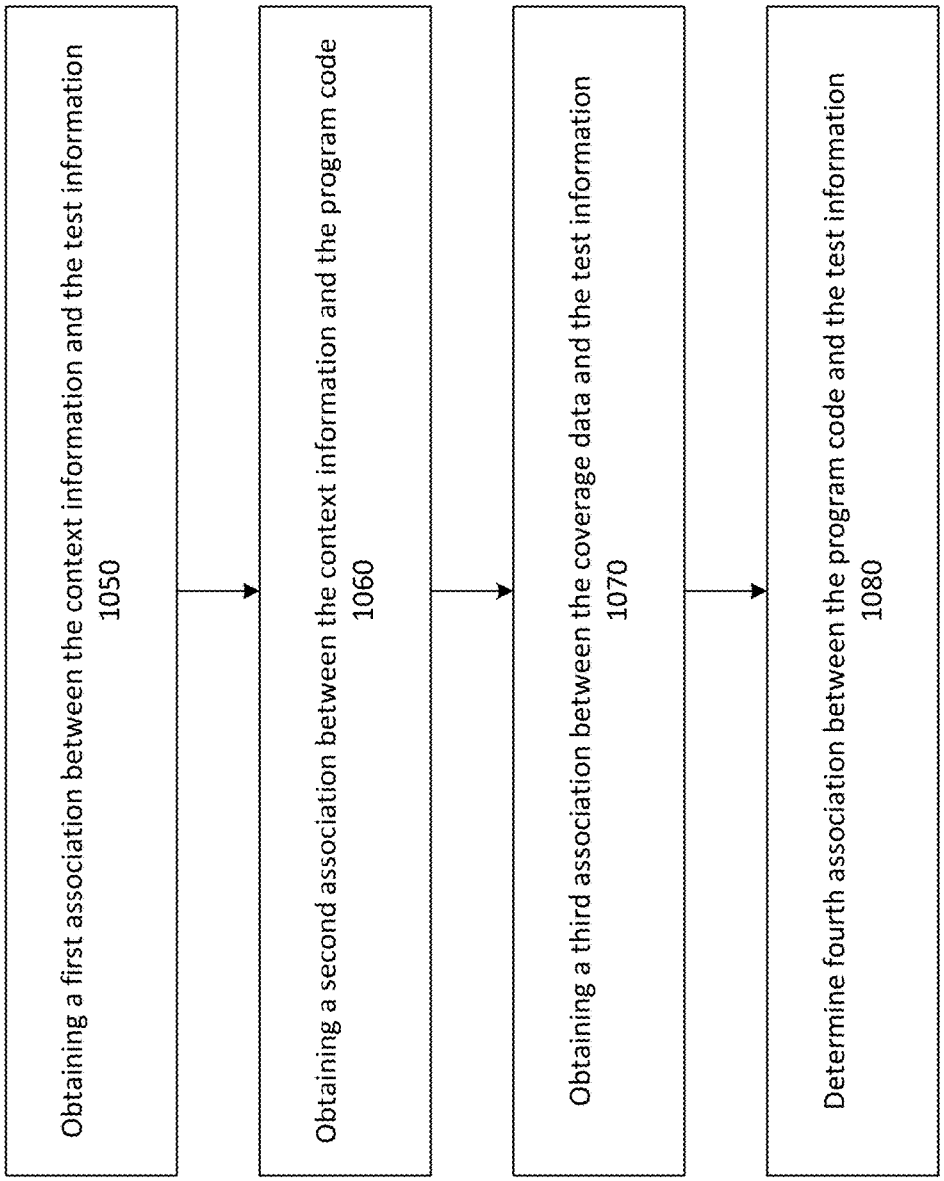
FIG. 10B depicts an exemplary method for determining an association between the coverage information and the program information.

FIG. 10B depicts an exemplary method for determining an association between the coverage information and the program space, consistent with disclosed embodiments. For convenience of description, method 1005 is described herein as performed by server device 220. However, this description is not intended to be limiting, as method 1005 may be individually or cooperatively performed by one or more of client device 210, server device 220, or additional client or server devices. Furthermore, the order of steps described with regards to FIG. 10B is not intended to be limiting. For example, the first, second, and third associations may be obtained in any order. As an additional example, the fourth association may be determined prior to obtaining the third association.

Method 1005 can include obtaining an association (e.g., association 113) between the context information and the test information in step 1050, consistent with disclosed embodiments. In some instances, the association can be received from another device. For example, the association can be received from client 210. In various embodiments, the association can be retrieved from a memory associated with server 220 (e.g., a computer memory of server device 220 or another device, or a non-transitory computer readable medium, such as a USB memory). In some instances, the association can be created by server 220. The association can be created by server 220 automatically or manually, based on data or instructions obtained by server 220.

In some embodiments, the association between the context information and the test information can be automatically identified by the technical computing environment. For example, when the context information comprises dependency information indicating that the behavior of components of the program code can be verified by checking an assertion (as depicted in FIG. 7), the technical computing environment can be configured to automatically associate tests that check this assertion with the context dependency information. As an additional example, the technical computing environment can be configured to automatically associate a test with a design requirement based on metadata for the test and/or for the component. As a further example, the technical computing environment can be configured to automatically associate a test with a test criterion based on a type of the test, or metadata associated with the test. As an additional example, a technical computing environment can be configured to automatically associate a test and an item of the context information based on a manner of creation of the test and/or the item of the context information. For example, when a user creates a design requirement by interacting with a graphical user interface view associated with a test, or when a user creates a test by interacting with a graphical user interface view associated with a design requirement, the technical computing environment may automatically associate the test with the design requirement.

In some embodiments, the association between the context information and the test information can be created in response to a user instruction to create the first association. In some instances, a user may provide instructions to associate a portion of the test information with an item of context information by interacting with a graphical user interface. For example, a user may select a representation of the portion of the test information and select a representation of the item of context information. In response to these selections, the technical computing environment can create an association between the portion of the test information and the item of context information.

Method 1005 can include obtaining an association (e.g., association 111) between the context information and the program code in step 1060, consistent with disclosed embodiments. In some instances, the association can be received from another device. For example, the second association can be received from client 210. In various embodiments, the association can be retrieved from a memory associated with server 220 (e.g., a computer memory of server device 220 or another device, or a non-transitory computer readable medium, such as a USB memory). In some instances, the association can be created by server 220. The association can be created by server 220 automatically or manually, based on data or instructions obtained by server 220.

In some embodiments, the association between the context information and the program code can be automatically identified by the technical computing environment. For example, when the context information comprises dependency information indicating that the behavior of components of the program code can be verified by checking an assertion (as depicted in FIG. 7), the technical computing environment can be configured to automatically associate the components of the program code with the context dependency information. As an additional example, the technical computing environment can be configured to automatically associate a component of the program code with a design requirement based on metadata for the design requirement and/or for the component. As a further example, the technical computing environment can be configured to automatically associate a component with an item of context information indicating a test criterion based on a type of the component. As an additional example, a technical computing environment can be configured to automatically associate a portion of the program information and an item of the context information based on a manner of creation of the portion of the program information and/or the item of the context information. For example, when a user creates a design requirement by interacting with a graphical user interface view associated with a component of the program code, or when a user creates a component of the program by interacting with a graphical user interface view associated with a design requirement, the technical computing environment may automatically associate the component with the design requirement.

In some embodiments, the association between the context information and the program code can be created in response to a user instruction to create this association. In some instances, a user may provide instructions to associate a portion of the program code with an item of context information by interacting with a graphical user interface. For example, a user may select a representation of the portion of the program code and select a representation of the item of context information. In response to these selections, the technical computing environment can create an association between the portion of the program code and the item of context information.

Method 1005 can include obtaining an association (e.g., association 115) between the coverage information and the test information in step 1070, consistent with disclosed embodiments. In some instances, the association can be received from another device, such as client 210. For example, the association can be received from a device that performed the testing of the program code according to the testing information. In some embodiments, the association can be received together with the coverage information. In various embodiments, the association can be retrieved from a memory associated with server 220 (e.g., a computer memory of server device 220 or another device, or a non-transitory computer readable medium, such as a USB memory). In some instances, the association can be created by server 220. For example, the technical computing environment can be configured to ensure that coverage information collected during performance of a test on the program code is traceable to the test (e.g., by instrumenting the program code to collect coverage point results). This traceability can constitute an association between the collected coverage information and the test, consistent with disclosed embodiments.

In some embodiments, the association between the context information and the program code can be created in response to a user instruction to create the association. In some instances, a user may provide instructions to associate coverage information with a test by interacting with a graphical user interface. For example, a user may select a representation of the test and select a representation of the coverage. In response to these selections, the technical computing environment can create an association between the test and the coverage information.

Method 1005 can include determining a fourth association between the test information and the program information in step 1080. In some embodiments, the fourth association can be determined for a particular set of context information using the first association and second association, as described above with respect to FIG. 1. This determination may depend on associations and/or structures within the program information, context information and test information.

Figure 11A:
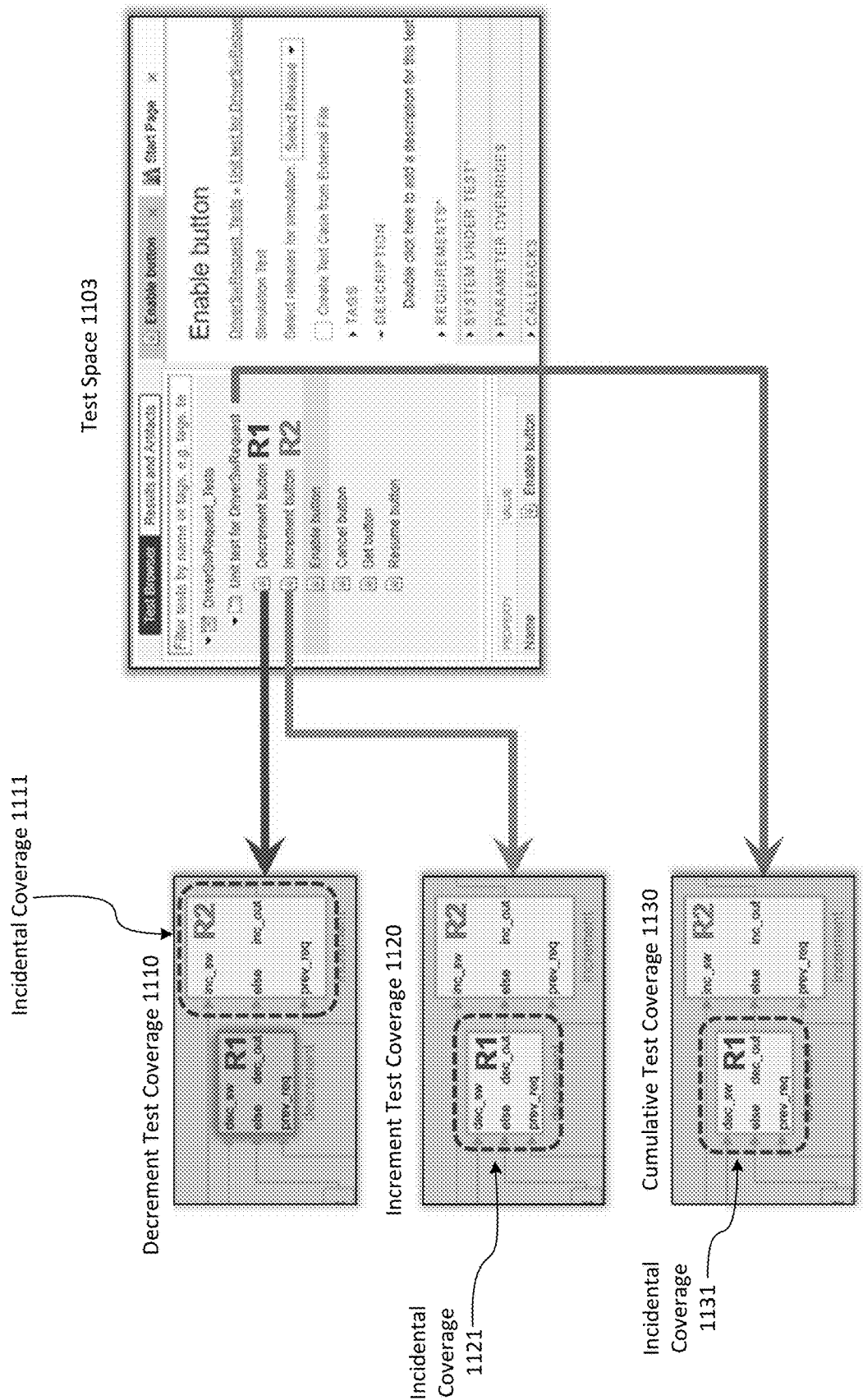
FIGS. 11A and 11B depict an exemplary graphical user interface for displaying coverage associated with model elements.
Figure 11B:
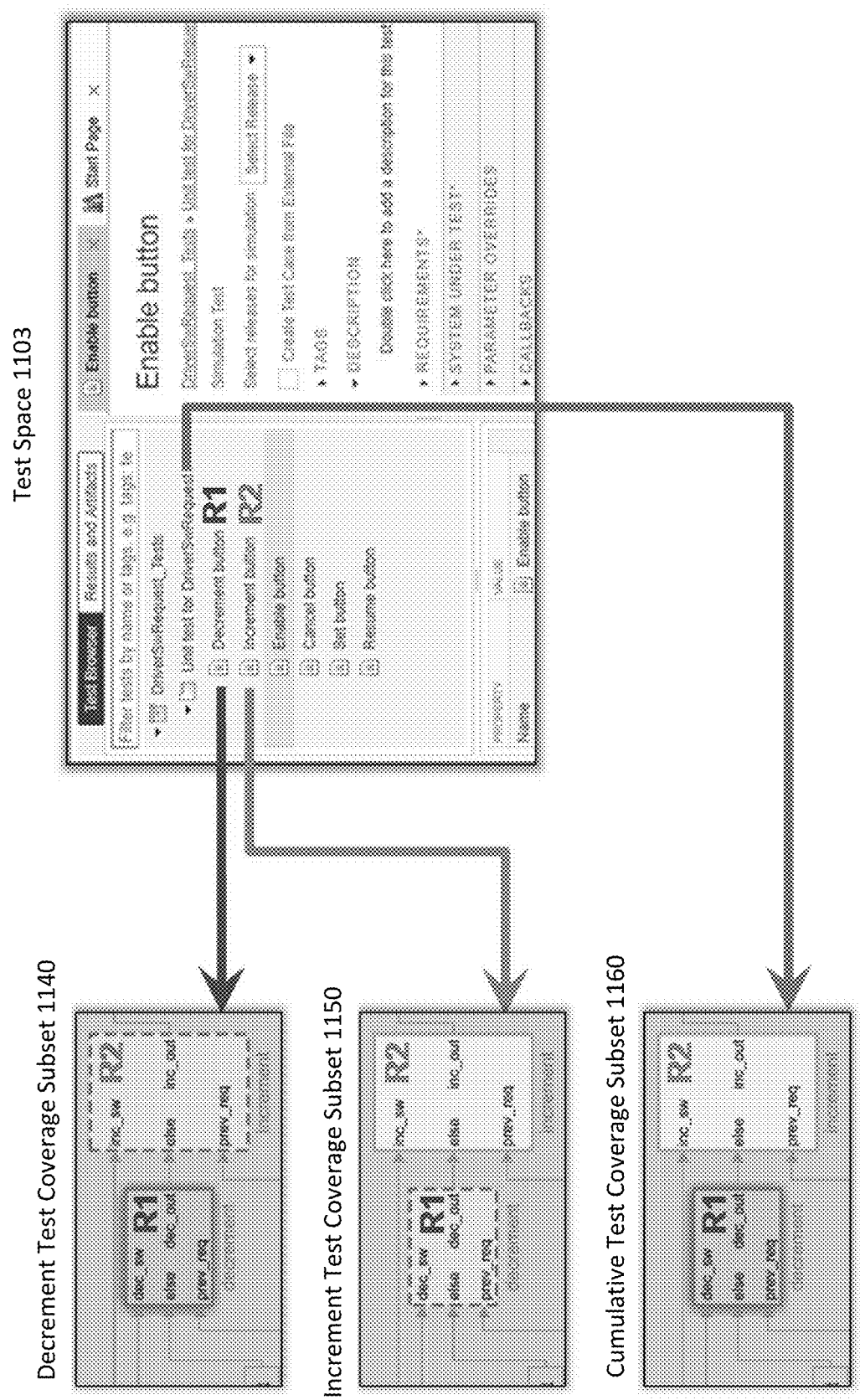

FIGS. 11A and 11B depict an exemplary graphical user interface for displaying coverage associated with model elements. As shown, the graphical user interface can include a heat map of the coverage information superimposed on a graphical depiction of the program code (e.g., a block diagram of graphical program code). FIG. 11A depicts a first mode of the graphical user interface in which all collected coverage contributes to the coverage display for all portions of the program code. FIG. 11B depicts a second mode of the graphical user interface in which coverage associated with a portion of the program code only contributes to the coverage display for the associated portions of the program code.

In FIG. 11A, Decrement Test Coverage 1110 depicts an exemplary display of a portion of graphical program code including two components (a decrement component associated with requirement "R1" and an increment component associated with requirement "R2"). The decrement button test that is shown in test space 1103, a decrement button test is associated with the decrement component. For example, the decrement button test may be associated with context information that is, in turn, associated with the decrement component (in this non-limiting example requirement "R1", as described above with respect to FIG. 6). Similarly, the increment button test may be associated with the increment component.

A user may interact with the graphical user interface to select the decrement button test. In response, as shown in Decrement Test Coverage 1110, indications of a degree of coverage are shown for the decrement component and the increment component. The indications can include changes in the shape, size, color, animation, emphasis, shadow, textual effects, or other visual characteristics of the decrement component and the increment component as displayed in Decrement Test Coverage 1110. As shown, the color of the decrement component and the increment component can depend on a degree of coverage for the component. In this manner, the graphical user interface can display an indication of a degree of coverage of the decrement component and the increment component of the graphical program code.

In some embodiments, the degree of coverage can be the proportion of coverage points associated with the component and reached during the test. The degree of coverage can be binned. For example, the proportion of coverage associated with a component can be mapped to three bins. A proportion less than a first threshold (e.g., 0.5) may map to a first bin, a proportion greater than the first threshold and less than a second threshold (e.g., 0.8) may map to a second bin, and a proportion greater than the third threshold may map to a third bin. Each threshold may be associated with different values of a visual characteristic. For example, as shown in FIG. 11A, the first bin may be associated with the color red and the third bin may be associated with the color green. In this example, the decrement component has a proportion of coverage less than 0.5, while the increment component has a proportion of coverage greater than 0.8. However, the decrement button test was not designed or intended to test the increment component. Therefore the depicted coverage of the increment component is incidental (e.g. shown as incidental coverage 1111).

As shown in Increment Test Coverage 1120, in response to a user interacting with the graphical user interface to select the increment button unit test, indications of a degree of coverage for the decrement component and the increment component, for coverage collected during the increment button test, can be shown. However, though the decrement component is shown as having a degree of coverage greater than 0.8, the increment button test was not designed or intended to test the decrement component. Therefore the depicted coverage of the decrement component is incidental (e.g. shown as incidental coverage 1121).

As shown in Cumulative Test Coverage 1130, in response to a user interacting with the graphical user interface to select the overall DriverSWRequest unit test, indications of a degree of coverage for the decrement component and the increment component, for coverage collected during both the decrement and increment tests, can be shown. The depicted coverage is cumulative, and therefore the decrement component is shown as having a degree of coverage greater than 0.8, even though the measured coverage of the decrement component was collected during the increment button test, which was not designed or intended to test the decrement component. Therefore the depicted coverage of the decrement component includes incidental coverage (e.g. shown as incidental coverage 1131). As shown in FIG. 11A, such incidental coverage may obscure a gap in testing. The test designed and intended to provide coverage of the decrement component does not provide sufficient coverage, but this deficiency is obscured by the incidental coverage collected during performance of the increment button test.

In FIG. 11B, as in FIG. 11A, test space 1103 includes a DriverSWRequest unit test including a decrement button test associated with a decrement component and an increment button test associated with an increment component. However, the graphical user interface of FIG. 11B is configured to display an indication, for a program component, of the coverage collected during a test and associated with the program component. For example, decrement test coverage subset 1140 depicts indications of that subset of the coverage collected during the decrement button test associated with the decrement component. As shown, the degree of coverage for the decrement component remains less than 0.5, but an indication of incidental coverage 1111 is no longer displayed. Likewise, increment test coverage subset 1150 depicts indications of the subset of the coverage collected during the increment button test associated with the increment component. As shown, the degree of coverage for the increment component remains greater than 0.8, but an indication of incidental coverage 1121 is no longer displayed. Finally, cumulative test coverage subset 1160 displays indications of the degree of coverage associated with each of the decrement and increment components. While in cumulative test coverage 1130, the incidental coverage collected during the increment button test obscured the relative lack of coverage achieved by the decrement button test, the deficiencies of the decrement button test are clearly observable in cumulative test coverage subset 1160.

Figure 12A:
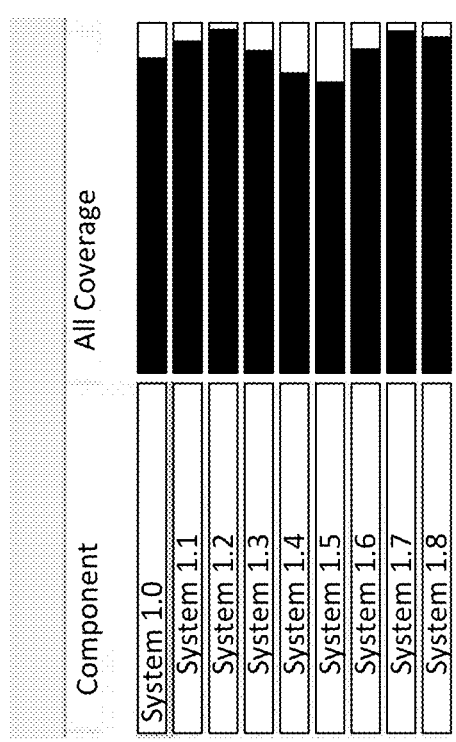
FIGS. 12A and 12B depict an exemplary graphical user interface for displaying aggregated coverage.
Figure 12B:
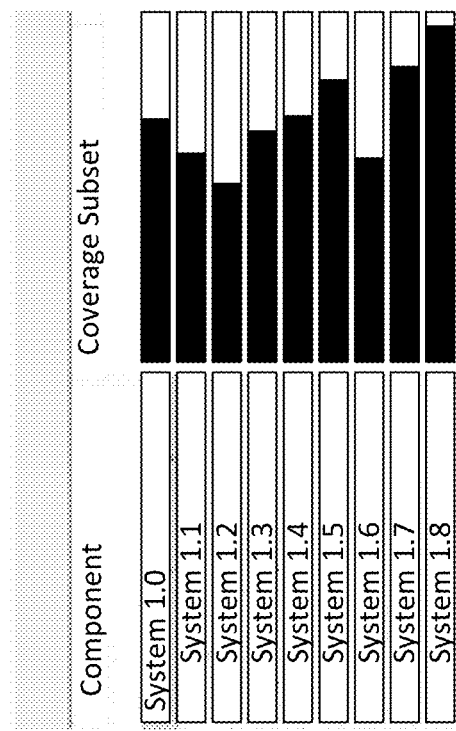

FIGS. 12A and 12B depict an illustrative example of an exemplary graphical user interface for displaying coverage information, consistent with disclosed embodiments. As shown in FIGS. 12A and 12B, a component "System 1.0" of a model is listed, together with subcomponents "System 1.1" to "System 1.8". Displayed with each entry in the list is an indication of a degree of coverage. In this non-limiting example, the degree of coverage is indicated by the amount of shading in a completion bar. For example, a greater degree of coverage is shown in FIG. 12A for "System 1.2" than for "System 1.5". As would be appreciated by those of skill in the art, other approaches to displaying a degree of coverage are possible, and the particular user interface shown in FIGS. 12A and 12B are not intended to be limiting.

FIG. 12A depicts a first mode of the exemplary graphical user interface in which all coverage collected during testing according to the test information is displayed. Because the display in FIG. 12A includes all collected coverage, it may include coverage collected for components during tests not designed or intended to test those components (e.g., incidental coverage). In contrast, FIG. 12B depicts a second mode in which only coverage associated with a component, for example through an association generated as described above with regards to FIG. 1, is displayed for the component. The degree of coverage depicted in FIG. 12B is generally less than the degree of coverage depicted in FIG. 12A, as the display does not include, for a component, coverage collected during testing of the component but not associated with the component. Consequently, FIG. 12B can enable a user to identify components that require additional testing by tests designed and intended to cover these components. For example, the degree of coverage depicted for subcomponents "System 1.2" and "System 1.6" in FIG. 12B is much less than the degree of coverage depicted for these subcomponents in FIG. 12A. This difference suggests that much of the coverage of these components has been collected incidental to the testing of other components, and that these components may require additional testing.

First Exemplary Embodiment

In a non-limiting exemplary embodiment, a graphical model may include a component. A user may create an association between the component and a design requirement for the graphical model. The user may also create an association between the design requirement and a first test in a suite of tests. The technical computing environment can be configured to create an association between the component and the first test based on the association between the design requirement and a first test and the association between the component and the design requirement.

The technical computing environment can be configured to collect coverage point results while performing tests on the graphical model. Coverage point results collected during performance of a test can be automatically associated with that test and with corresponding coverage points by the technical computing environment.

Based on the association between the component and the test, the association between the coverage point result and the test, and the association between the coverage point results and the corresponding coverage points, the technical computing environment can categorize the coverage point results as meaningful.

The technical computing environment can be configured to display a graphical representation of the graphical model with a heat map overlaid. The heat map can indicate a degree of coverage, based on all coverage point results collected during performance of the tests. In response to a user input, the heat map can display only coverage categorized as meaningful. In this example, of the coverage point results collected during the first test, only the coverage point results for the component are used to generate the heat map.

CONCLUSION

Systems and/or methods described herein may enable categorization and/or sub-setting of coverage information for program code using context information. The systems and/or methods may test the program code, and may collect coverage information including coverage point results during this testing. The systems and/or methods may determine an association between a test and a component of the program using context information. Based on the association, the systems and/or methods may categorize and/or subset the coverage information. An indication of one or more categories (or a subset) of the coverage information may be displayed.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "module" that performs one or more functions. This module may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising, obtaining program information including program code and test information for testing the program code, the test information associated with context information for providing context for testing the program code, wherein:
    the program code comprises multiple code portions and the program code simulates a system; and
    the context information comprises at least one contextual item for a subset of the system that is part of, but not all of, the system;
    generating coverage information by testing the program code according to the test information, wherein the coverage information comprises, for each of the multiple code portions, associated coverage result information;
    determining a first association that identifies a subset of, but not all of, the test information for the subset of the system;
    determining a second association that identifies a code portion of the multiple code portions of the program code that simulates the subset of the system;
    determining a third association between the coverage result information of the coverage information and the test information;
    determining a subset of the coverage information for the subset of the system based on the third association and a fourth association that identifies that the subset of the test information is for testing the code portion of the program code that simulates the subset of the system associated with the at least one contextual item of the context information, wherein:
        the subset of the coverage information is part of, but not all of, the coverage information;
        the fourth association is determined based on the first and second associations; and
        the subset of the coverage information is the coverage result information for the code portion of the program code that simulates the subset of the system associated with the at least one contextual item of the context information; and
    providing instructions to display an indication of the subset of the coverage information.

2. The method of claim 1, wherein:
    the at least one contextual item of the context information comprises at least one of a requirement, an assessment, or a test criterion.

3. The method of claim 1, wherein:
    the test information specifies a test sequence.

4. The method of claim 1, wherein:
    the program code comprises model components, wherein one of the model components comprises the code portion;
    the test information specifies tests, wherein one of the tests comprises the subset of the test information; and
    the third association comprises an association between the one of the tests and coverage result information of the coverage information for the one of the model components.

5. The method of claim 1, wherein:
    the program code comprises a model; and
    determining the second association comprises performing a dependency analysis on the model.

6. The method of claim 1, wherein:
    the test information specifies a test, wherein a portion of the test comprises the subset of the test information;
    the at least one contextual item of the context information indicates a time interval; and
    the first association associates the portion of the test during the time interval with the at least one contextual item of the context information.

7. The method of claim 1, wherein:
    the test information specifies a test, wherein a portion of the test comprises the subset of the test information;
    the at least one contextual item of the context information indicates a test state or a program state; and
    the first association associates the portion of the test with the at least one contextual item of the context information.

8. The method of claim 1, wherein:
    the test information specifies a test, wherein a portion of the test comprises the subset of the test information;
    the at least one contextual item of the context information includes design requirements;
    the first association associates the design requirements with the portion of the test;
    the second association associates the design requirements with the code portion of the program code; and the fourth association indicates a propagation of the first association through the design requirements to the second association.

9. The method of claim 1, wherein:
the test information specifies a test, wherein a portion of the test comprises the subset of the test information;
the at least one contextual item of the context information includes design requirements;
the first association associates the design requirements with the portion of the test;
the second association associates the design requirements with the code portion of the program code; and
displaying an indication of the subset of the coverage information comprises:
in response to selection of at least one of a design requirement of the design requirements or a model component of model components of the program code, displaying a portion of the subset of the coverage information, the portion associated with the selected at least one of the design requirement or the model component.

10. The method of claim 1, wherein:
the program code comprises a model, wherein a component of the model comprises the code portion of the program code;
the method further comprises:
in response to a user input, determining the subset of the coverage information includes coverage point results associated with the component of the model; and
displaying an indication of the subset of the coverage information comprises:
in response to the determination, changing a depiction of the component in a graphical representation of the model.

11. A system comprising:
at least one processor; and
at least one memory containing instructions that, when executed by the at least one processor, cause the system to perform operations comprising:
obtaining program information including program code and test information for testing the program code, the test information associated with context information for providing context for testing the program code, wherein:
the program code comprises multiple code portions and the program code simulates a system; and
the context information comprises at least one contextual item for a subset of the system that is part of, but not all of, the system;
generating coverage information by testing the program code according to the test information, wherein the coverage information comprises, for each of the multiple code portions, associated coverage result information;
determining a first association that identifies a subset of, but not all of, the test information for the subset of the system;
determining a second association that identifies a code portion of the multiple code portions of the program code that simulates the subset of the system;
determining a third association between the coverage result information of the coverage information and the test information;
determining a subset of the coverage information for the subset of the system based on the third association and a fourth association that identifies that the subset of the test information is for testing the code portion of the program code that simulates the subset of the system associated with the at least one contextual item of the context information, wherein:
the subset of the coverage information is part of, but not all of, the coverage information; the fourth association is determined based on the first and second associations; and the subset of the coverage information is the coverage result information for the code portion of the program code that simulates the subset of the system associated with the at least one contextual item of the context information; and
providing instructions to display an indication of the subset of the coverage information.

12. The system of claim 11, wherein:
the at least one contextual item of the context information comprises at least one of a requirement, an assessment, or a test criterion.

13. The system of claim 11, wherein:
the test information specifies a test sequence.

14. The system of claim 11, wherein:
the program code comprises model components, wherein one of the model components comprises the code portion;
the test information specifies tests, wherein one of the tests comprises the subset of the test information; and
the third association comprises an association between the one of the tests and coverage result information of the coverage information for the one of the model components.

15. The system of claim 11, wherein:
the program code comprises a model; and
determining the second association comprises performing a dependency analysis on the model.

16. The system of claim 11, wherein:
the test information specifies a test, wherein a portion of the test comprises the subset of the test information;
the at least one contextual item of the context information indicates a time interval; and
the first association associates the portion of the test during the time interval with the at least one contextual item of the context information.

17. The system of claim 11, wherein:
the test information specifies a test, wherein a portion of the test comprises the subset of the test information;
the at least one contextual item of the context information indicates a test state or a program state; and
the first association associates the portion of the test with the at least one contextual item of the context information.

18. The system of claim 11, wherein:
the test information comprises a test, wherein a portion of the test comprises the subset of the test information; and
determining the subset of the coverage information further comprises determining the portion of the test was performed successfully.

19. The system of claim 11, wherein:
the test information specifies a test, wherein a portion of the test comprises the subset of the test information;
the at least one contextual item of the context information includes design requirements;
the first association associates the design requirements with the portion of the test;
the second association associates the design requirements with the code portion of the program code; and displaying an indication of the subset of the coverage information comprises:
  in response to selection of at least one of a design requirement of the design requirements or a model component of model components of the program code, displaying a portion of the subset of the coverage information, the portion associated with the selected at least one of the design requirement or the model component.

20. The system of claim 11, wherein:
the program code comprises graphical program code; and
providing instructions to display the indication of the subset of the coverage information comprises providing instructions to display a heat map of the coverage information superimposed on a display of the graphical program code.

21. A non-transitory computer readable medium containing instructions that, when executed by at least one processor, cause a system to perform operations comprising:
  obtaining program information including program code and test information for testing the program code, the test information associated with context information for providing context for testing the program code, wherein:
    the program code comprises multiple code portions and the program code simulates a system; and
    the context information comprises at least one contextual item for a subset of the system that is part of, but not all of, the system;
  generating coverage information by testing the program code according to the test information, wherein the coverage information comprises, for each of the multiple code portions, associated coverage result information;
  determining a first association that identifies a subset of, but not all of, the test information for the subset of the system;
  determining a second association that identifies a code portion of the multiple code portions of the program code that simulates the subset of the system;
  determining a third association between the coverage result information of the coverage information and the test information;
  determining a subset of the coverage information for the subset of the system based on the third association and a fourth association that identifies that the subset of the test information is for testing the code portion of the program code that simulates the subset of the system associated with the at least one contextual item of the context information, wherein:
    the subset of the coverage information is part of, but not all of, the coverage information;
    the fourth association is determined based on the first and second associations; and
    the subset of the coverage information is the coverage result information for the code portion of the program code that simulates the subset of the system associated with the at least one contextual item of the context information; and
  providing instructions to display an indication of the subset of the coverage information.

\* \* \* \* \*